United States Patent [19]
Rockstein et al.

[11] Patent Number: 5,789,730
[45] Date of Patent: *Aug. 4, 1998

[54] AUTOMATIC HAND-SUPPORTABLE LASER SCANNER AND METHOD OF READING BAR CODE SYMBOLS USING SAME

[75] Inventors: George Rockstein, Audubon; David Wilz, Sr., Sewell; Robert Blake, Woodbury Hts.; C. Harry Knowles, Moorestown, all of N.J.

[73] Assignee: Metrologic Instruments, Inc., Blackwood, N.J.

[ * ] Notice: The term of this patent shall not extend beyond the expiration date of Pat. No. 5,528,024.

[21] Appl. No.: 663,726

[22] Filed: Jun. 14, 1996

Related U.S. Application Data

[63] Continuation of Ser. No. 293,494, Aug. 19, 1994, Pat. No. 5,528,024, which is a continuation of Ser. No. 761,123, Sep. 17, 1991, Pat. No. 5,340,771, which is a continuation-in-part of Ser. No. 583,421, Sep. 17, 1990, Pat. No. 5,260,553.

[51] Int. Cl.$^6$ ...................................................... G06K 7/10
[52] U.S. Cl. .......................................... 235/472; 235/462
[58] Field of Search ...................................... 235/462, 472, 235/455, 463, 466; 255/555; 359/890, 887, 885

[56] References Cited

U.S. PATENT DOCUMENTS

| | | | |
|---|---|---|---|
| 5,424,525 | 6/1995 | Rockstein et al. | 235/472 X |
| 5,468,951 | 11/1995 | Knowles et al. | 235/472 |
| 5,484,992 | 1/1996 | Wile et al. | 235/472 |
| 5,500,516 | 3/1996 | Durbin | 235/472 |
| 5,525,789 | 6/1996 | Rockstein et al. | 235/472 |
| 5,528,024 | 6/1996 | Rockstein et al. | 235/472 |

*Primary Examiner*—Donald T. Hajec
*Assistant Examiner*—Thien Minh Le
*Attorney, Agent, or Firm*—Hopgood, Calimafde, Kalil & Judlowe LLP

[57] ABSTRACT

A method and apparatus for reading bar code symbols using a substrate hand-holdable bar code symbol reading device. In general, the automatic bar code symbol reading device comprises a hand-holdable housing containing operative elements which provide an object detection field and a scan field each defined external to the housing. The method involves automatically detecting the presence of an object within the object detection field by sensing object sensing energy reflected off the object. In a preferred embodiment, the object sensing energy is IR radiation produced from an object sensing energy source disposed within the housing. In automatic response to the detection of the object within the object detection field, the hand-holdable device detects the presence of a bar code within the scan field using a laser beam produced within the housing. Then, in automatic response to the detection of a bar code in the scan field, the automatic hand-holdable bar code symbol reading device reads the detected bar code in the scan field by producing scan data signals from the detected bar code and thereafter collecting and analyzing the same. Another aspect of the present invention concerns a hand-holdable data collection device adapted for use with the automatic bar code symbol reading device to form a portable symbol reading system characterized by versatility and simplicity of use.

26 Claims, 27 Drawing Sheets

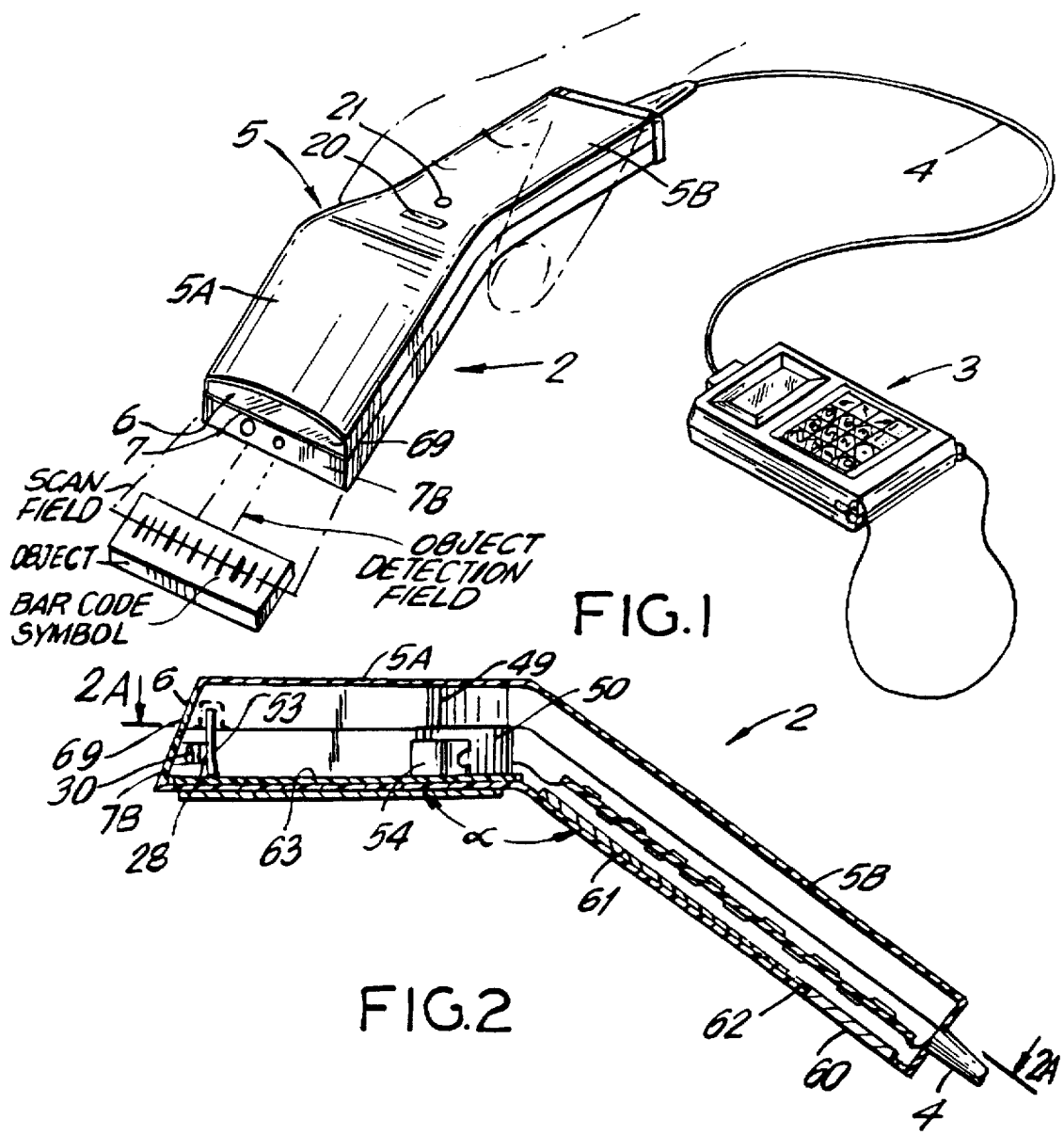
FIG.1
FIG.2
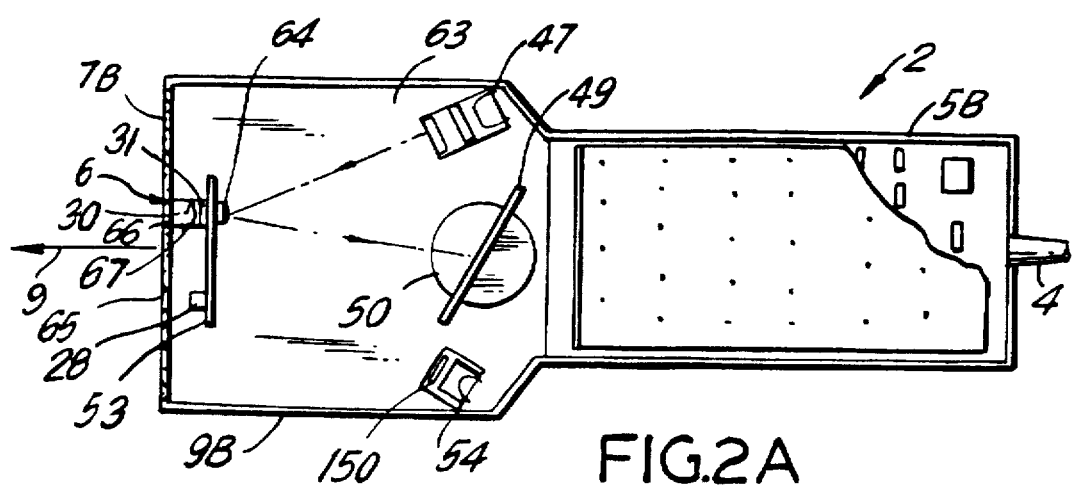
FIG.2A

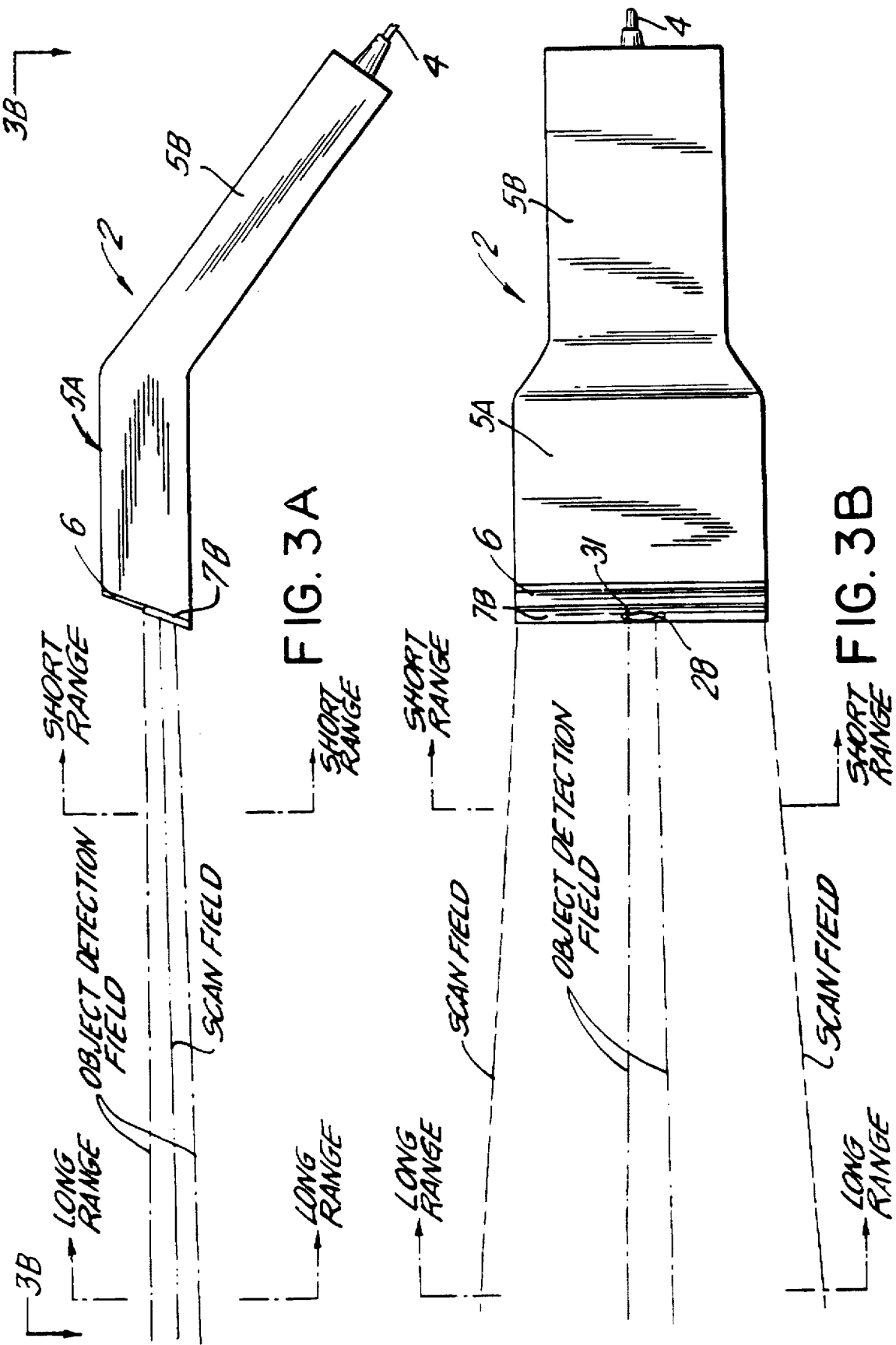

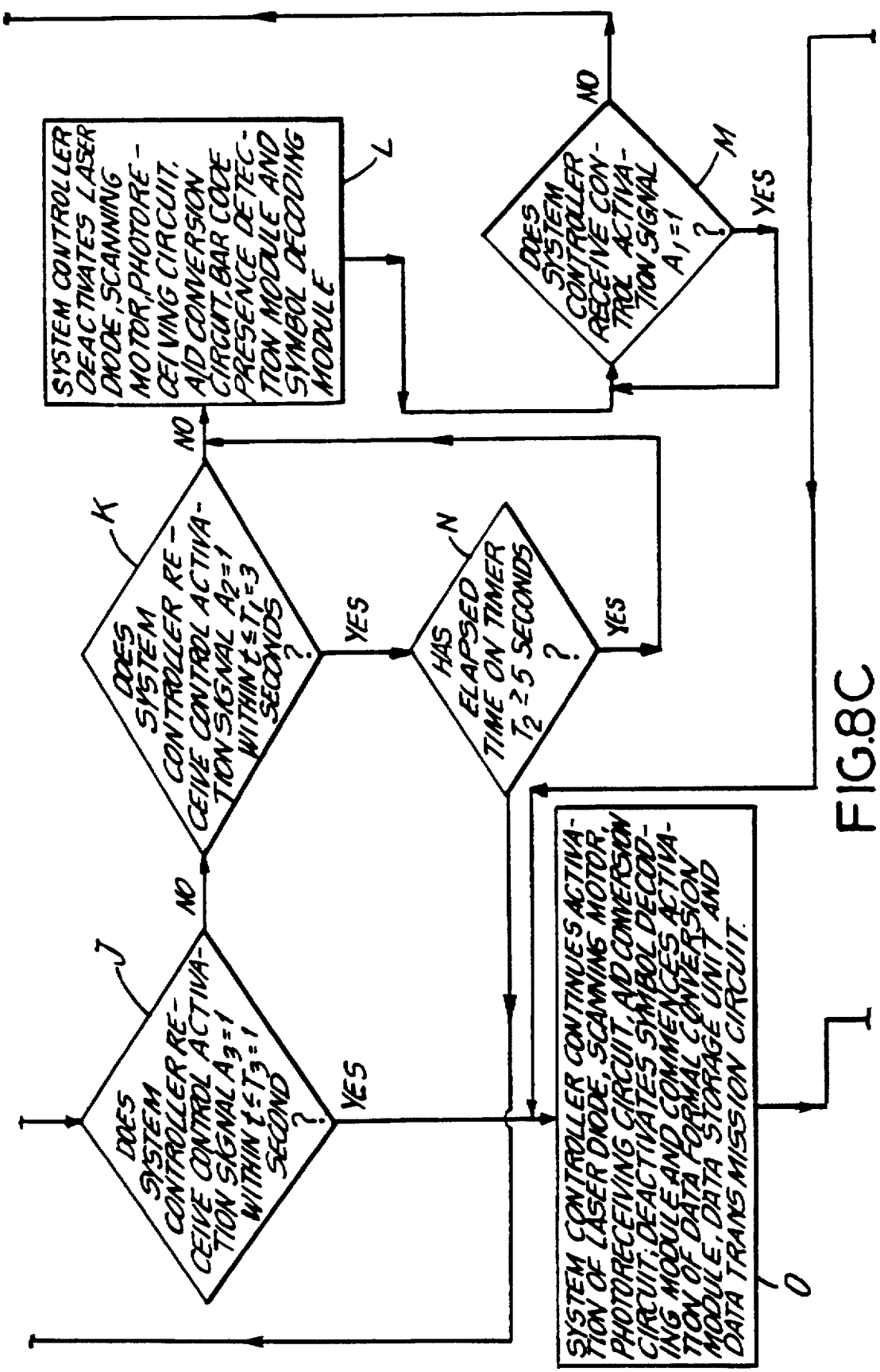

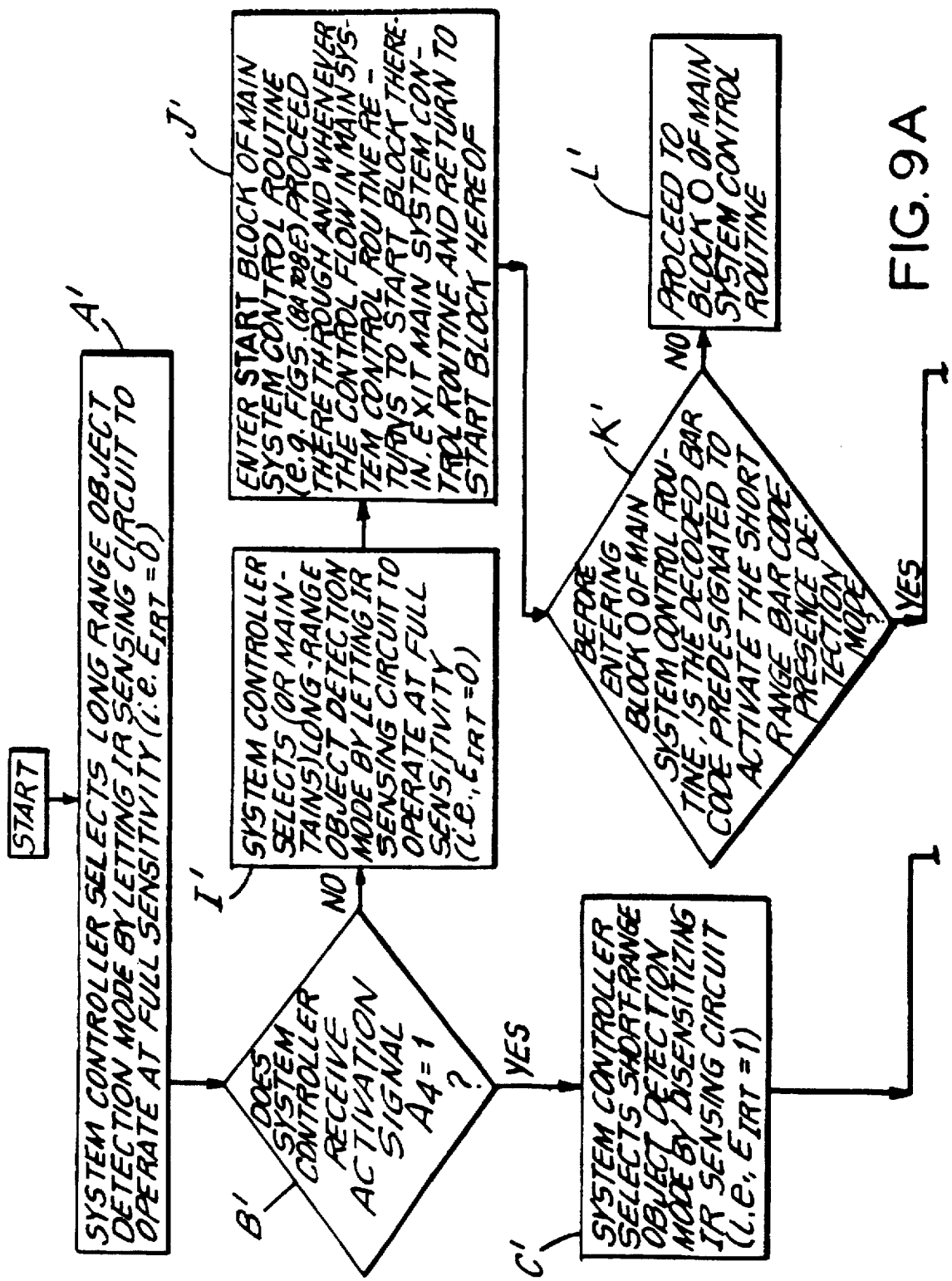

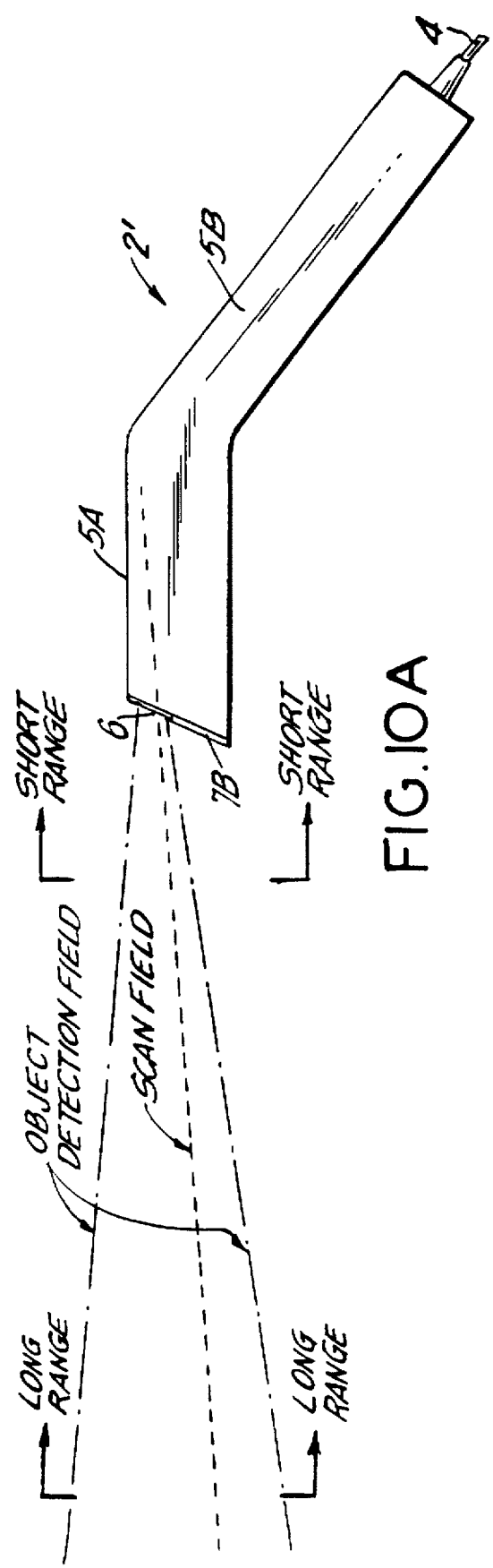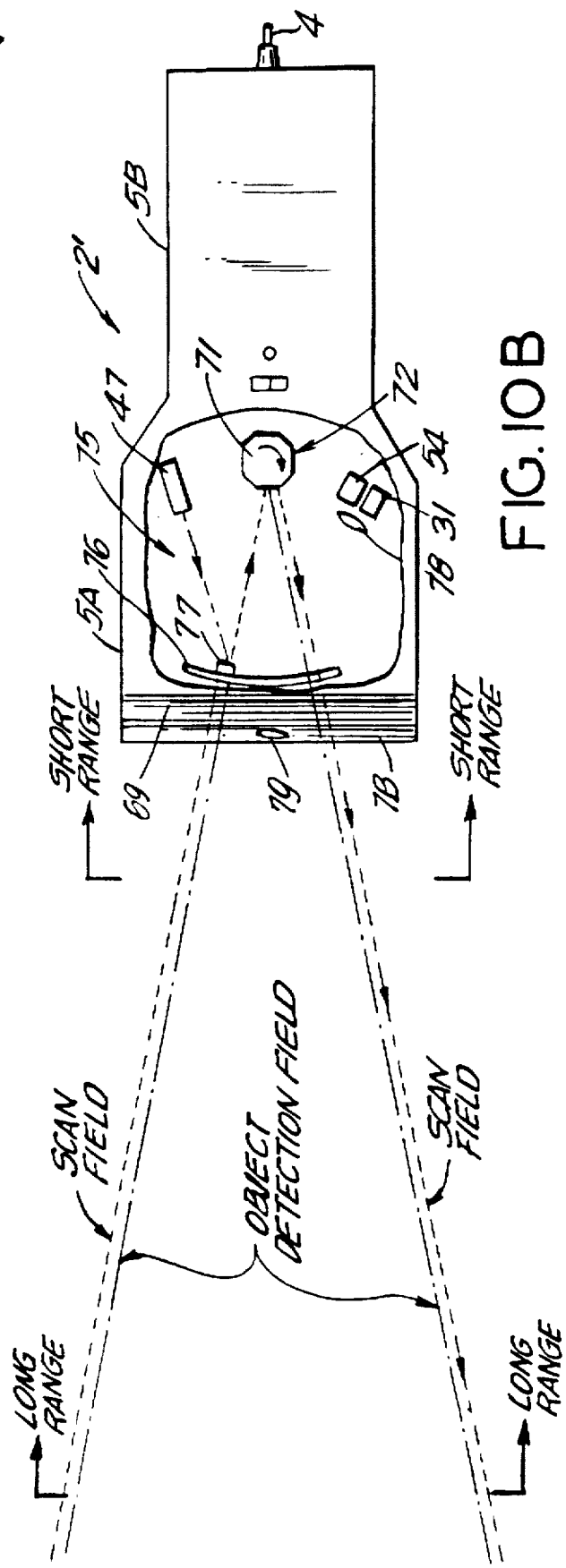

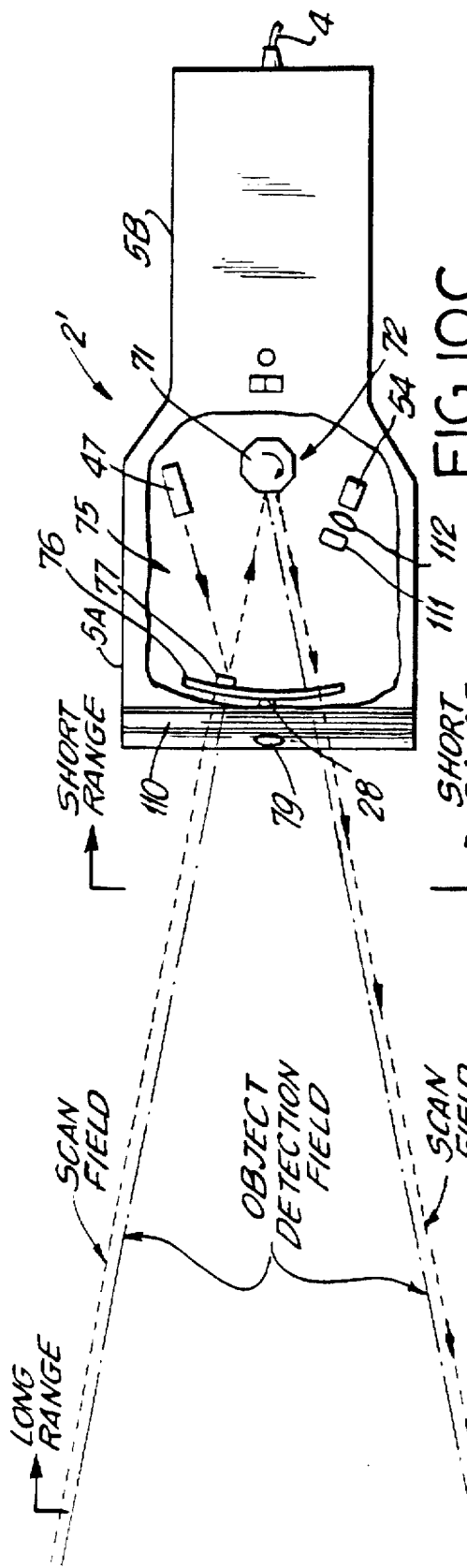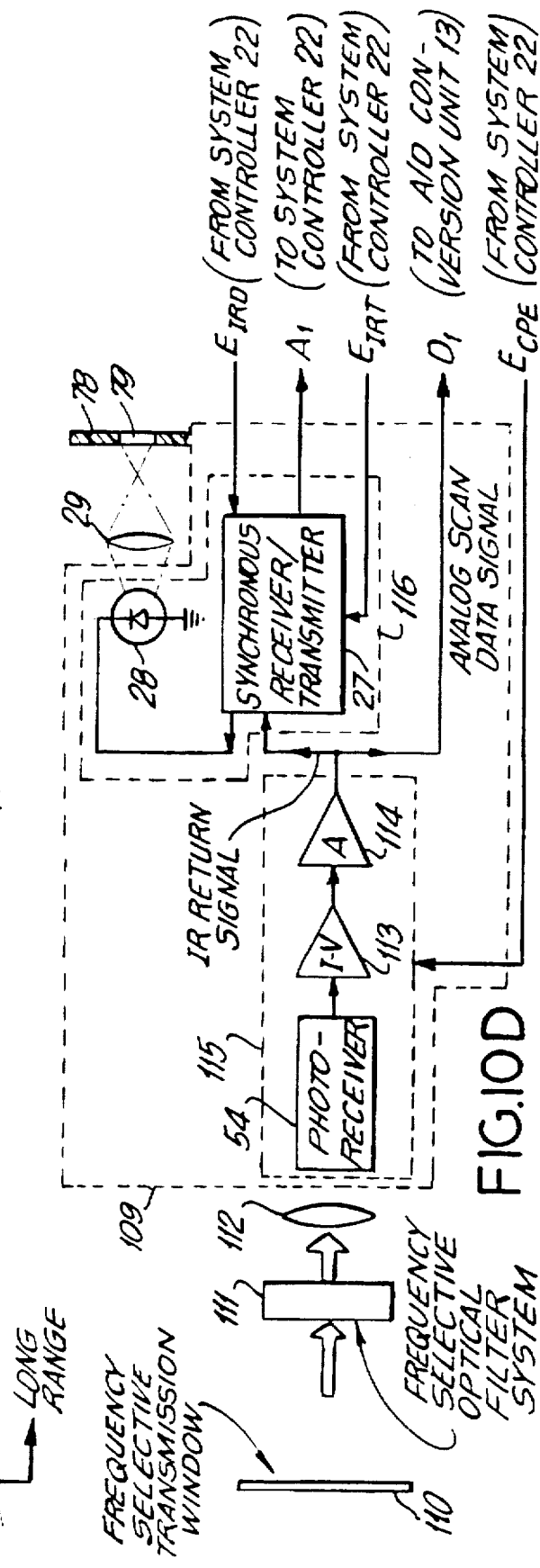

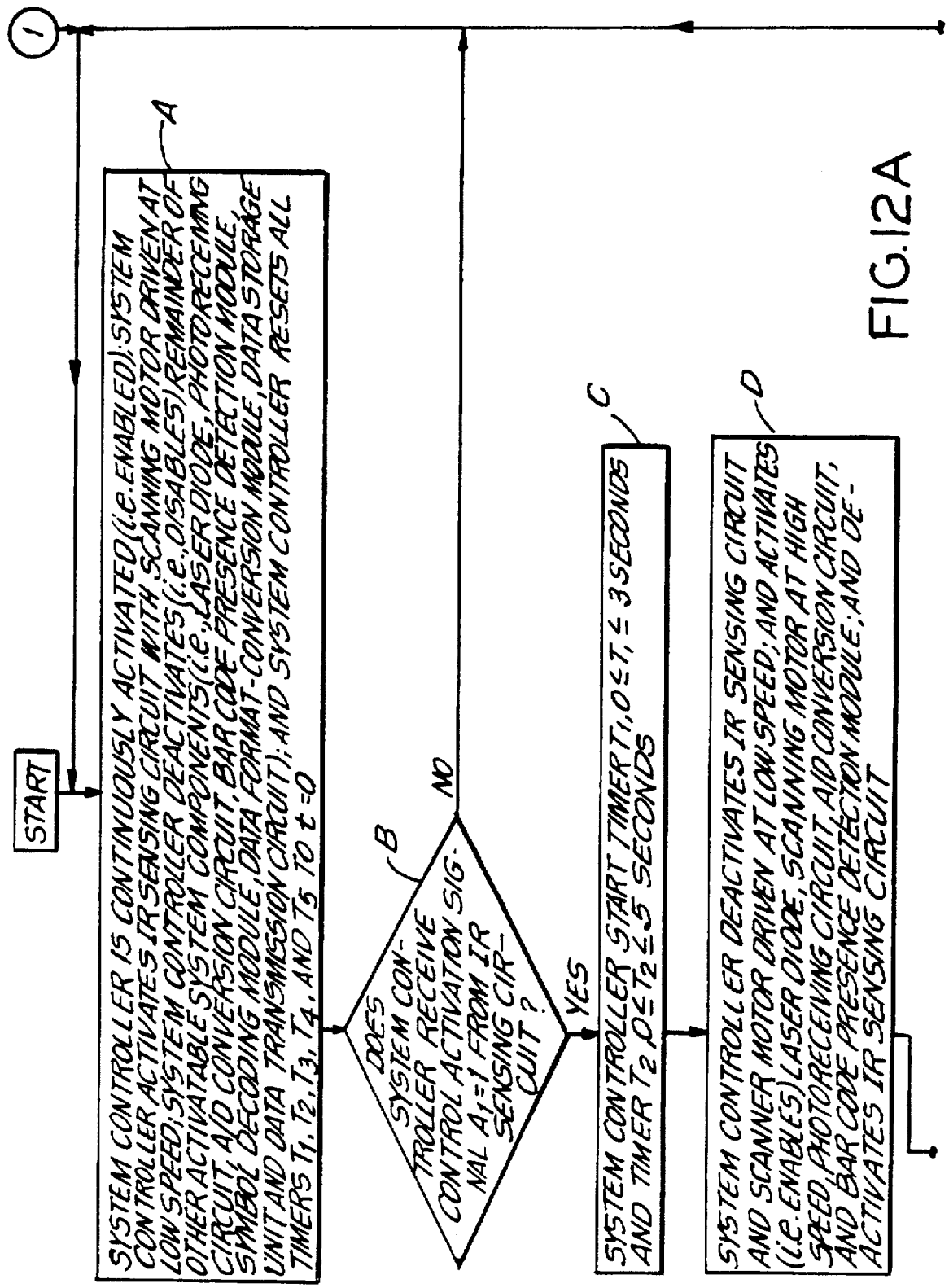

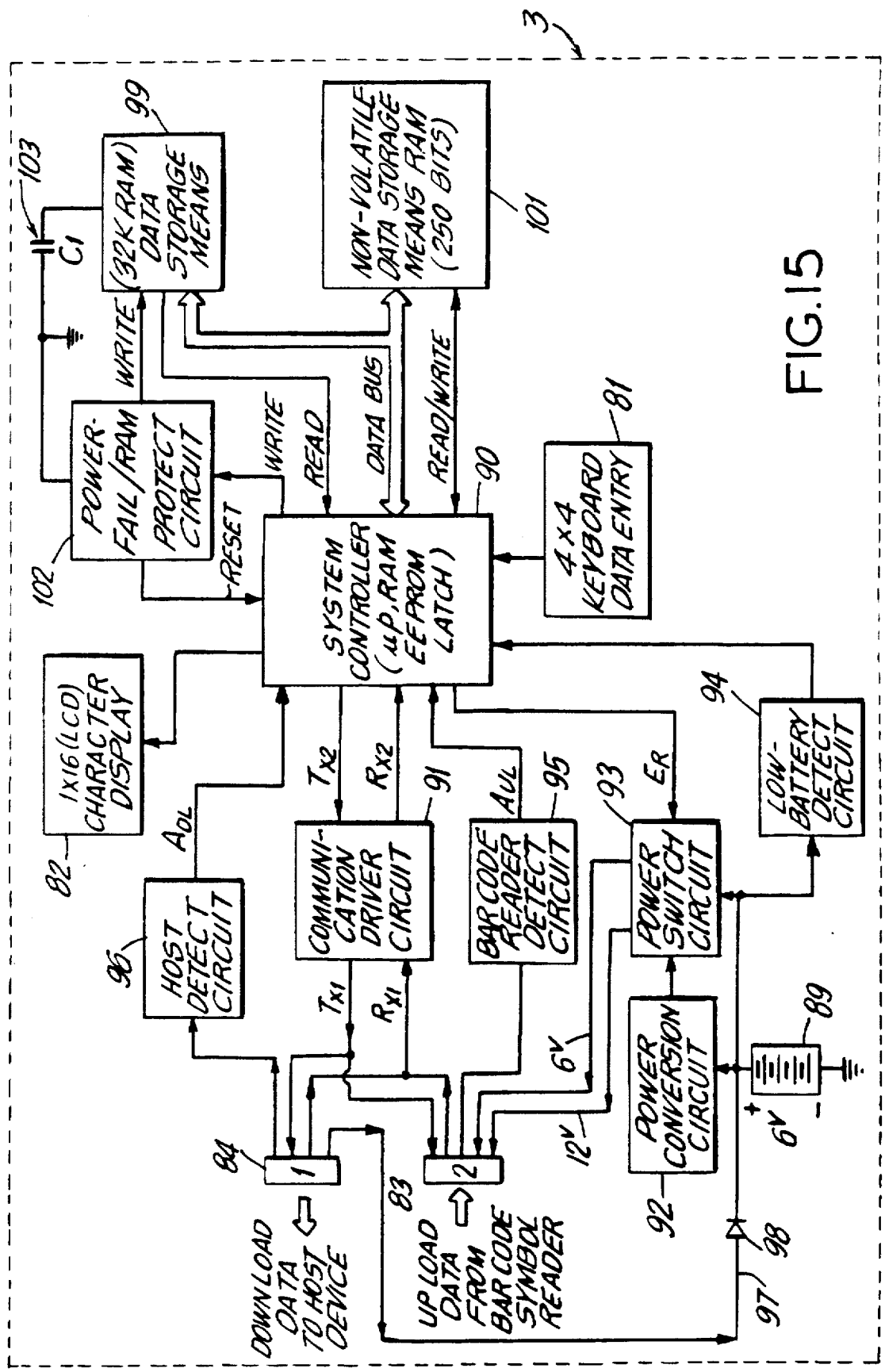

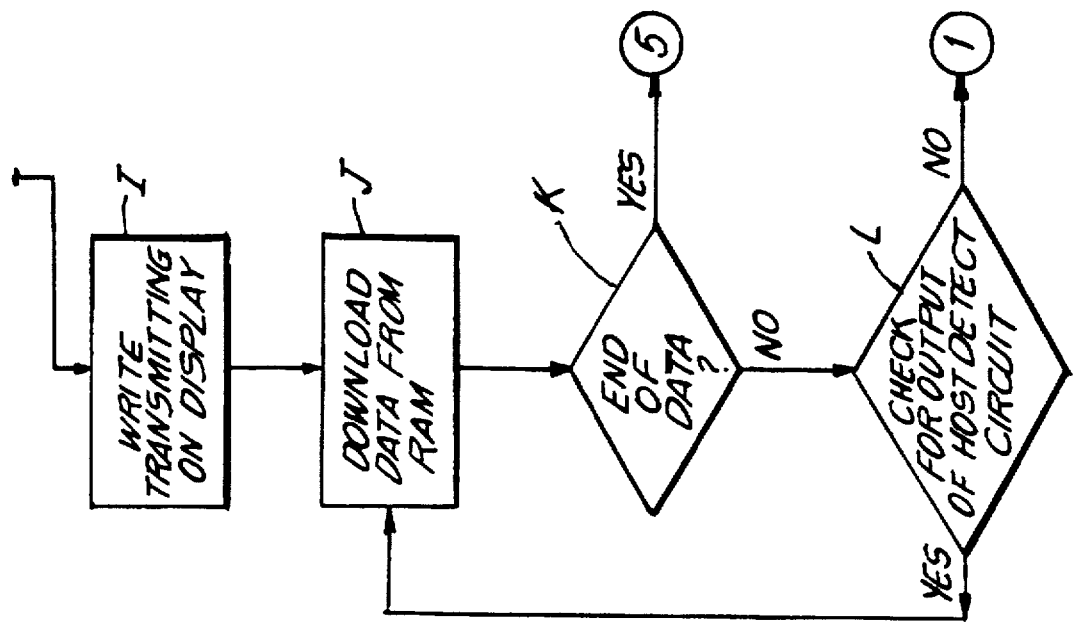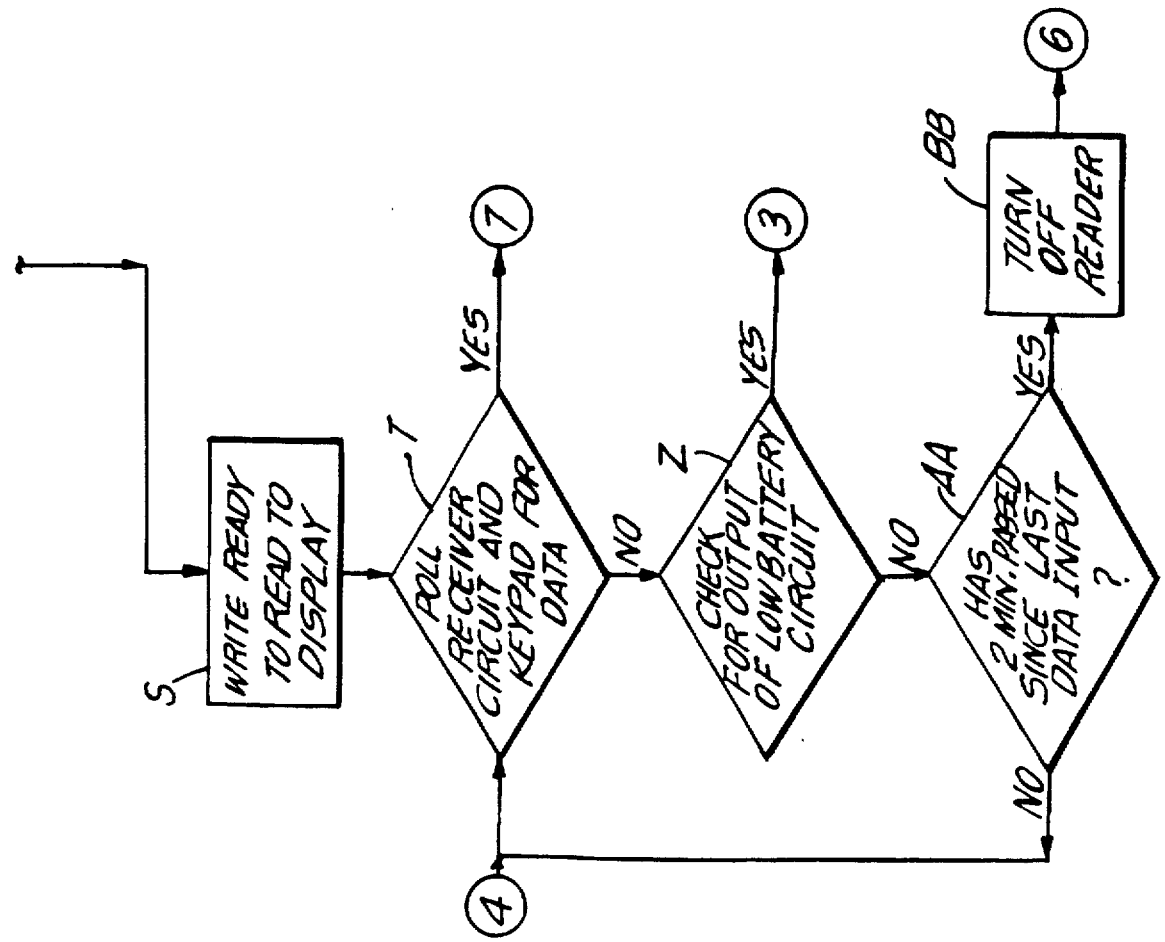
FIG. 16B

AUTOMATIC HAND-SUPPORTABLE LASER SCANNER AND METHOD OF READING BAR CODE SYMBOLS USING SAME

This is a continuation of application Ser. No. 08/293,494 filed Aug. 19, 1994, U.S. Pat. No. 5,528,024, which is a continuation of application Ser. No. 07/761,123 filed Sep. 17, 1991, now U.S. Pat. No. 5,340,771, which is a continuation-in-part of application Ser. No. 07/583,424 filed Sep. 17, 1990, now U.S. Pat. No. 5,260,553.

This application is a continuation-in-part of: application Ser. No. 07/583,421 entitled "Method and Apparatus for Automatically Reading Bar Code Symbols" filed on Sep. 17, 1990

BACKGROUND OF THE INVENTION

1. Field of the Invention

The present invention relates generally to automatic code symbol reading (i.e. recognition) systems, and more particularly to an automatic code symbol reading system which permits fully automated operation while providing a high degree of simplicity and versatility in its use.

2. Brief Description of the Prior Art

Hitherto, a number of techniques have been proposed for reading bar code symbols using hand-held devices. Despite variety amongst prior art bar code symbol reading devices, the various techniques incorporated into prior art devices can be classified into two principally distinct classes, namely, manually operated or triggered bar code symbol reading, and automatic bar code symbol reading.

Representative of prior art manually operated bar code symbol reading devices are U.S. Pat. No. 4,387,297 to Swartz, et al., U.S. Pat. No. 4,575,625 to Knowles, and U.S. Pat. No. 4,845,349 to Cherry. While such prior art devices are capable of bar code symbol reading, they nevertheless suffer from several significant shortcomings and drawbacks. In particular, the user is required to manually pull a trigger or push a button each time symbol reading (i.e. scanning and decoding) is to be cyclically initiated and terminated. This requirement is most fatiguing on the user when large numbers of bar code symbols are to be read. Also, in certain symbol reading applications, such as warehouse inventory, pulling the trigger to initiate scanning of bar code symbols may be extremely difficult for the user due to the physical location of the objects bearing the bar code symbols.

An alternative to manually operated bar code symbol reading devices is automatic bar code symbol readers, which incorporate techniques for automatically initiating and terminating scanning and decoding operations. Representative of prior art automatic bar code symbol devices are U.S. Pat. No. 4,639,606 to Boles, et al. and U.S. Pat. No. 4,933,538 to Heiman, et al. While capable of automatically initiating scanning of bar code symbols, such prior art devices and incorporated techniques nevertheless also suffer from significant shortcomings and drawbacks.

In particular, U.S. Pat. No. 4,639,606 to Boles, et al. discloses laser emission control circuitry for use in implementing a hand-held triggerless bar code scanner. The laser is operated in a pulsed "find paper" mode until a reflected signal is obtained, indicating the presence of an object (e.g., paper) in the search field. Thereupon, the circuitry is changed to a "search mode" in which the power of the laser is increased to above the safety limits for a period of time, and the return signal is monitored for signal transitions corresponding to the black bars of the code. On detection of the first black bar, the circuitry is changed to an "in-code" (i.e. decode) mode as long as successive symbols are received within a given period of time. If the decode mode terminates within a predetermined time interval (e.g., one second after the beginning of the search mode), then the search mode is re-entered, otherwise the decode mode will change to find paper mode.

While the triggerless bar code symbol reader proposed in U.S. Pat. No. 4,639,606 possesses three modes of operation, this prior art bar code symbol reader nevertheless suffers from several significant shortcomings and drawbacks. In particular, this prior art bar code symbol reader requires continuous use of a pulsed laser beam to determine the presence of an object within the scan field, which, in hand-held portable battery power-devices, undesirably drains limited power reserves, especially in extended time duration bar code reading applications. Also, this prior art device, not knowing whether a bar code symbol is actually present in the scan field, requires commencement of decode processing upon detection of the first black bar. Undesirably, this typically necessitates initializing a programmable device, such as a microprocessor, for decoding scan data that may likely contain no bar code symbol at all. Consequently, this characteristic of such prior art bar code symbol reading devices results in decreased responsiveness and versatility.

U.S. Pat. No. 4,933,538 discloses a bar code symbol reading system which, in the "object sensor mode", is triggerless and constantly emits a laser beam at a narrow angle and low power. When an indicia pattern indicative of a bar code symbol has been detected, the laser beam is widened and its power increased, for reading the entire symbol. While this prior art bar code reading system permits detection of bar code symbols within the scan field in order that the power of the laser beam may be automatically increased to a higher level for collecting scan data for use in decoding operations, this system also suffers from several significant shortcomings and drawbacks. In particular, it requires continuous use of laser emission to determine the presence of both objects and bar code symbols within the scan field, which necessarily results in drain of limited power reserves in portable battery power applications. In addition, the extensive use of a laser beam to perform object and bar code symbol detection functions implicates necessity for laser emission control measures.

In general, prior art automatic bar code symbol reading devices of the type described above, suffer from other shortcomings and drawbacks. For example, unlike manually operated devices which use a trigger to activate trigger bar code symbol reading, pulled once for each bar code to be read, prior art automatic bar code symbol reading devices lack intelligence capabilities necessary to prevent undesired multiple reading of a bar code symbol, particularly when the scanning beam is permitted to dwell on a bar code symbol for extended period of time.

Further, prior art automatic bar code symbol reading devices lack system control capabilities which permit diverse modes of operation and automatic reading of a plurality of consecutively different bar code symbols, while preventing misreads and inadvertent multiple reads of the same bar code symbol.

Thus, there is a great need in the code symbol reading art for a fully automatic hand-holdable code symbol reading device which overcomes the above shortcomings and drawbacks of prior art devices and techniques.

OBJECTS AND SUMMARY OF THE INVENTION

Accordingly, it is a primary object of the present invention to provide a fully automatic hand-holdable bar code symbol reading device capable of automatically reading one or more bar code symbols in a consecutive manner without the above-described shortcomings and drawbacks of prior art devices.

Another object of the present invention is to provide such an automatic bar code symbol reading device which is capable of detecting an object bearing a bar code symbol in an object detection field using object sensing energy, and in response thereto, scanning a light beam across a scan field in order to detect the presence of a bar code symbol, and only thereafter proceed to read the detected bar code symbol.

A further object is to provide such an automatic bar code symbol reading device, in which the object detection field spatially encompasses at least a portion of the scan field along the operative scanning range of the device.

A further object of the present invention is to provide an automatic hand-holdable bar code symbol reading device which is capable of collecting and detecting reflected IR object sensing energy and laser return light using common collection optics and signal processing circuitry.

Another object of the present invention is to provide a hand-holdable bar code symbol reading device which is capable of distinguishing between a bar code symbol and a regular pattern of light and dark areas such as that formed by printed characters, and to only enable bar code symbol reading operations upon the detection of a bar code symbol in the scan field of the device.

An even further object of the present invention is to provide an automatic bar code symbol reading device which prevents multiple reading of the same bar code symbol due to dwelling of scanning beam upon a bar code symbol for an extended period of time.

A further object of the present invention is to provide a method of automatically reading a plurality of bar code symbols in a consecutive manner.

A further object of the present invention to provide an automatic hand-holdable bar code reading device having long range and short range modes of object detection within its object detection field. Such modes of object detection can be either manually selected by the user, or automatically selected when the hand-holdable bar code reading device is placed within a support stand designed for long-range object and bar code symbol detection and bar code symbol reading.

A further object of the present invention is to provide an automatic bar code reading device having long-range and short range (i.e. close-up) modes of bar code presence detection within its scan field. The short range mode of bar code presence detection can be manually selected, or automatically selected upon decoding a predesignated bar code symbol which actuates a particular mode of range selection. In the short range mode of bar code presence detection, the automatic bar code reading device not only detects the presence of a bar code within the scan field by analysis of collected scan data, but it further processes the collected scan data to produce digital count data representative of the measured time interval between bar and/or space transitions. Bar code symbols present within a particular range in the scan field will produce scan data having time interval characteristics falling within a prespecified timing data range. Using the results of this analysis, only bar code symbols scanned within the short range field will be deemed "detected," and only bar code symbols detected within the short range of the scan field can activate the decoding module of the device, and thus enable bar code reading.

It is an object of the present invention to provide an automatic hand-holdable bar code reading device which has both long and short range modes of object and bar code presence detection, separately or simultaneously-selectable for various bar code symbol reading applications, such as for example, bar code "menu" reading, counter-top projection scanning, charge coupled device (CCD) scanner emulation, and the like.

It is a further object of the present invention to provide an automatic hand-holdable bar code symbol reading device having a control system which has a finite number of states through which the device may pass during its automatic operation in response to diverse conditions detected within the object detection and scan fields of the device.

It is a further object of the present invention to provide a portable hand-holdable data collection device, to which the automatic bar code symbol reading device can be connected for supply of power and transmission and storage of symbol character data, collected during portable bar code symbol reading applications in, for example, retail, industrial and manufacturing environments where freedom of bar code scanner movement and flexibility are important considerations.

It is yet a further object of the present invention to provide a portable, fully automatic hand-holdable bar code reading system which is compact, simple to use and versatile.

Yet a further object of the present invention is to provide an improved method of automatically reading bar code symbols.

These and further objects of the present invention will become apparent hereinafter and in the claims.

BRIEF DESCRIPTION OF THE DRAWINGS

For a fuller understanding of the objects of the present invention, the Detailed Description of the Illustrated Embodiments will be taken in connection with the drawings, wherein:

FIG. 1 is a perspective view of an automatic hand-holdable laser bar code symbol reading device constructed in accordance with the principles of the present invention;

FIG. 2 is a cross-sectional elevated side view along the longitudinal extent of the automatic bar code symbol reading device of FIG. 1, showing various hardware and software components used in realizing the first illustrative embodiment;

FIG. 2A is a cross-sectional plan view along the longitudinal extent of the automatic bar code symbol reading device taken along line 2A—2A of FIG. 2, also showing the various components used in realizing the first illustrative embodiment;

FIG. 3 is an elevated side view of the bar code reading device of the first embodiment of the present invention, illustrating the spatial relationship between the object detection and scan fields of the device, and the long and short range of programmed object detection and bar code presence detection of the first illustrative embodiment;

FIG. 3A is a plan view of the automatic bar code reading device taken along line 3B—3B of FIG. 3, also illustrating the spatial relationship between the object detection and scan fields of the device and the long and short ranges of object and bar code presence detection of the illustrative embodiment;

FIGS. 9A to 9B, taken together, is a high level flow chart of another system control program (i.e., System Control Routine with Object Detection and Scan Range Selection), which provides the automatic bar code symbol reading device of the present invention with several selectable modes of object and bar code presence detection for use during various applications, such as bar coded menu reading, automatic CCD scanner emulation, stand supported scanning and the like;

FIG. 10A is an elevated side view of the automatic bar code reading device of the second embodiment of the present invention, illustrating the spatial relationship between the object detection and scan fields of the device, and also the long and short ranges of programmed object and bar code presence detection;

FIG. 10B is a partially cut away plan view of the automatic bar code reading device of FIG. 10, showing various operative components thereof;

FIGS. 10C-D is a partially cut away plan view of an alternative embodiment of the automatic bar code symbol reading device of the present invention showing the layout of the optical signal processing system in which both laser return light and IR return energy are collected through common optics within the hand-holdable housing, and detected using a single photoreceiver and common signal processing circuitry FIG. 10C is schematic diagram representative of the optical signal processing system employed in the bar code symbol reading device of the second illustrative embodiment shown in FIG. 10B;

FIG. 15 is a block functional system diagram of the data collection device of the present invention, showing the system components integrated about its system controller.

DETAILED DESCRIPTION OF THE ILLUSTRATED EMBODIMENTS

Figure 4:
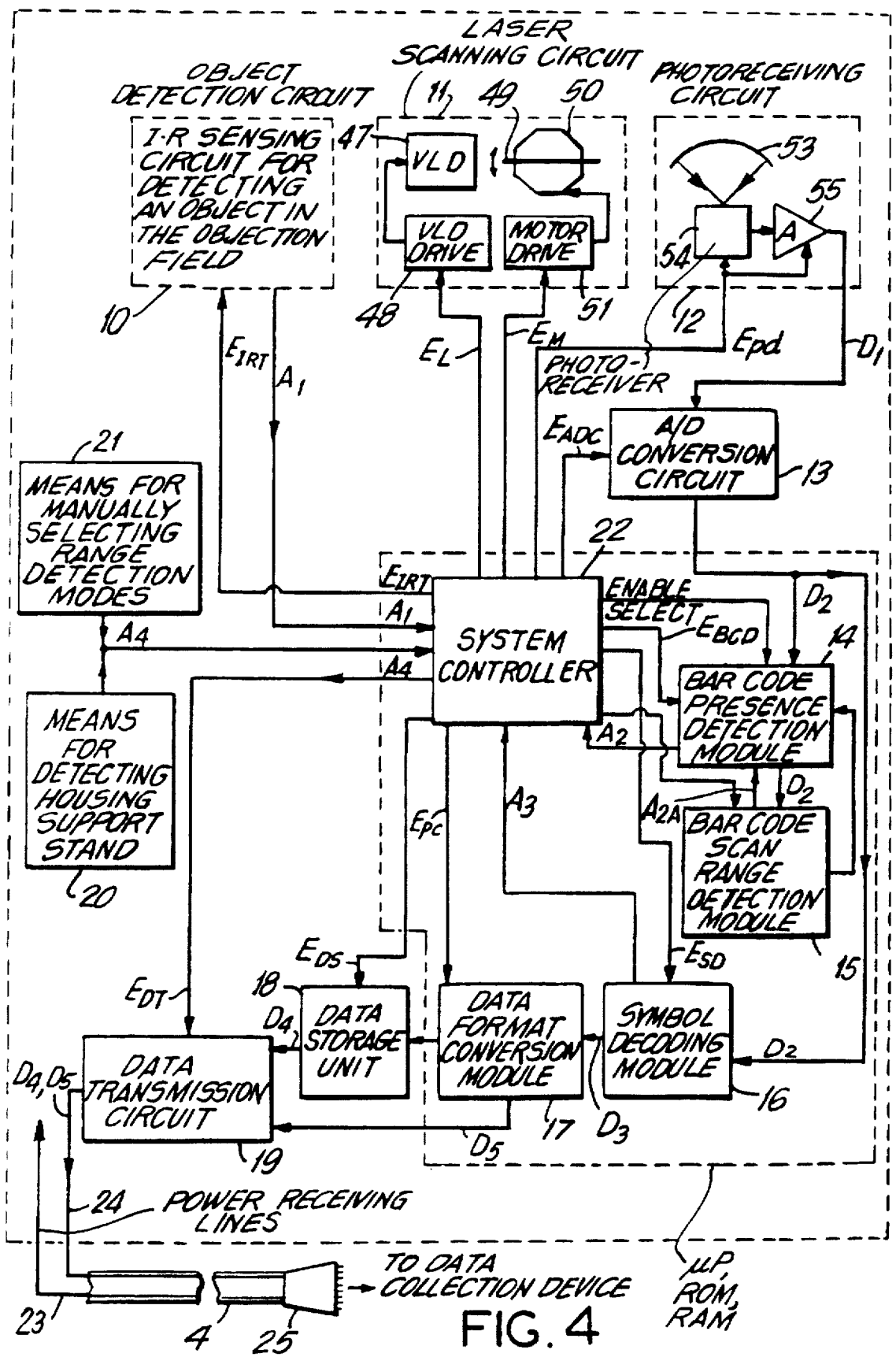
FIG. 4 is block functional system diagram of the automatic bar code symbol reading device of the first embodiment of the present invention, illustrating the principal components of the device integrated with the control system thereof.

In FIG. 1, the portable automatic hand-holdable bar code symbol reading system of the present invention, is illustrated. As shown, automatic bar code symbol reading system 1 comprises an automatic hand-holdable bar code symbol reading device 2 operably associated with hand-holdable data collection device 3 of the present invention. Operable interconnection of bar code symbol reading device 2 and data collection device 3 is achieved by a flexible multiwire connector cord 4 extending from bar code symbol device 2 and plugged directly into the data-input communications port of the data collection device 3. A detailed description of the structure, functions and operation of the data collection device hereof will be provided hereinafter referring to FIGS. 14 through 16B. Attention will first be accorded, however, to the various illustrative embodiments of the automatic bar code symbol reading device of the invention. The first illustrative embodiment will be described by referring to FIGS. 1 through 9, and then the second illustrative embodiment will be described with reference to FIGS. 1 and 10 through 13.

Referring now to FIG. 1 through 3A, automatic bar code symbol reading device 2 of the first illustrative embodiment is shown to comprise an ultra lightweight hand-holdable housing 5 which has a head portion 5A that continuously extends into a contoured handle portion 5B at an obtuse deflection angle a which can be in the range of 150 to about 170 degrees. In a preferred embodiment, deflection angle a is about 160 degrees. This ergonomic housing design is sculptured (i.e., form-fitted) to the hand, making scanning as easy and effortless as a wave of the hand, while eliminating risks of musculoskeletal disorders, such as carpal tunnel syndrome, which can result from repeated biomechanical stress commonly associated with pointing prior art gun-shaped scanners at a bar code, squeezing the trigger to activate the scanning beam, and then releasing the trigger.

As illustrated in FIGS. 1 through 3B, the head portion of housing 5 has a transmission aperture 6 formed in upper portion of front panel 7, to permit desired optical radiation to exit and enter the housing, as will be described in detail hereinafter. The lower portion of front panel 7B is optically opaque, as are all other surfaces of the hand-holdable housing.

As illustrated in FIGS. 1, 3 and 3B in particular, automatic bar code reading device 2 generates two different fields external to the hand-holdable housing, in order to carry out automatic bar code symbol reading according to the principles of the present invention. Specifically, an object detection field, indicated by broken and dotted lines, is provided externally to the housing for detecting object sensing energy reflected off an object bearing a bar code symbol, located within the object detection field. A scan field, on the other hand, having at least one scanning plane of essentially planar extent, is provided external to the housing for scanning an object present within the scan field. Such scanning is achieved with a light beam so that scan data can be collected for detecting the presence of a bar code within the scan field, and subsequently reading (i.e., scanning and decoding) the detected bar code symbol.

In general, object sensing energy can be optical radiation or acoustical energy, either sensible or non-sensible by the operator, and may be either generated by an external ambient source, or from the automatic bar code symbol reading device itself. In the illustrative embodiments, the object sensing energy is a beam of infra-read light projected forwardly from transmission aperture 6 in a spatially directed fashion, preferably essentially parallel to the longitudinal axis 9 of the head portion of the housing. In a preferred embodiment, the object detection field has a three-dimensional volumetric expanse spatially coincident with the transmitted infrared light beam. This ensures that an object within the object detection field will be illuminated by the infrared light beam and that infrared light reflected therefrom will be directed generally towards the transmission aperture of the housing where it can be detected, to indicate that an object is within the object detection field.

In order to scan a bar code symbol on an object within the object detection field, a light beam is generated within the head portion of the housing and scanned through the transmission aperture across the scan field. As illustrated in FIG. 1, at least a portion of the scanned light beam will be reflected off the bar code symbol and directed back towards and through the transmission aperture for collection, detection and subsequent processing in a manner which will be described in detail hereinafter. To ensure that an object detected within the object detection field is scanned by the scanning light beam, the object detection field spatially encompasses at least a portion of the scan field along the operative scanning range of the device, as illustrated in FIGS. 3A and 3B.

To more fully appreciate the mechanisms employed in providing the object detection and scan fields of bar code symbol reading device 2, reference is best made to the operative elements within the hand-holdable housing.

As shown in FIG. 4, bar code symbol reading device of the first illustrative embodiment comprises a number of system components, namely, an object detection circuit 10, scanning means 11, photoreceiving circuit 12, analog-to-digital (A/D) conversion circuit 13, bar code presence detection module 14, bar code scan range detection module 15, symbol decoding module 16, data format conversion module 17, symbol character data storage unit 18, and data transmission circuit 19. In addition, a magnetic field sensing circuit 20 is provided for detecting housing support stand, while a manual switch 21 is provided for selecting long or short range modes of object and bar code presence detection. As illustrated, these components are operably associated with a programmable system controller 22 which provides a great degree of versatility in system control, capability and operation. The structure, function and advantages of this controller will be described in detail hereinafter.

In the illustrated embodiment, system controller 22, bar code presence detection module 14, bar code scan range detection module 15, symbol decoding module 16, and data format conversion module 17 are realized using a single programmable device, such as a microprocessor having accessible program and buffer memory, and external timing means. It is understood, however, that any of these elements can be realized using separate discrete components as will be apparent to those skilled in the art.

Automatic bar code symbol reading device 2 also includes power receiving lines 23 which lead to conventional power distribution circuitry (not shown) for providing requisite power to each of the system components, when and for time prescribed by the system controller. As illustrated, power receiving lines 23 are provided within the encasing of flexible connector cord 4, run alongside data communication lines 24 of the device, and are thus physically associated with a multi-pin connector plug 25 at the end of the flexible connector cord. An on/off power switch or functionally equivalent device may be provided external the hand-holdable housing to permit the user to energize and deenergize the device. In the first illustrative embodiment, power delivered through the connector cord to the bar code symbol reading device is continuously provided to system controller 22 and object detection circuit 10 to continuously enable their operation, while only biasing voltages and the like are provided to all other system components. In this way, each remaining system component is initially deactivated (i.e., disabled) from operation and must be activated (i.e., enabled) by the system controller.

In accordance with the present invention, the purpose of the object detection circuit is to determine (i.e., detect) the presence of an object (e.g., product, document, etc.) within the object detection field of bar code symbol reading device 2, and in response thereto, produce first control activation signal $A_1$. In turn, first control activation signal $A_1$ is provided as input to the system controller which, as will be described in greater detail hereinafter, causes the device to undergo a transition to the bar code symbol presence detection state. In FIGS. 5A and 5B, two different approaches to detecting the presence of an object within the object detection field are disclosed.

Figure 5:
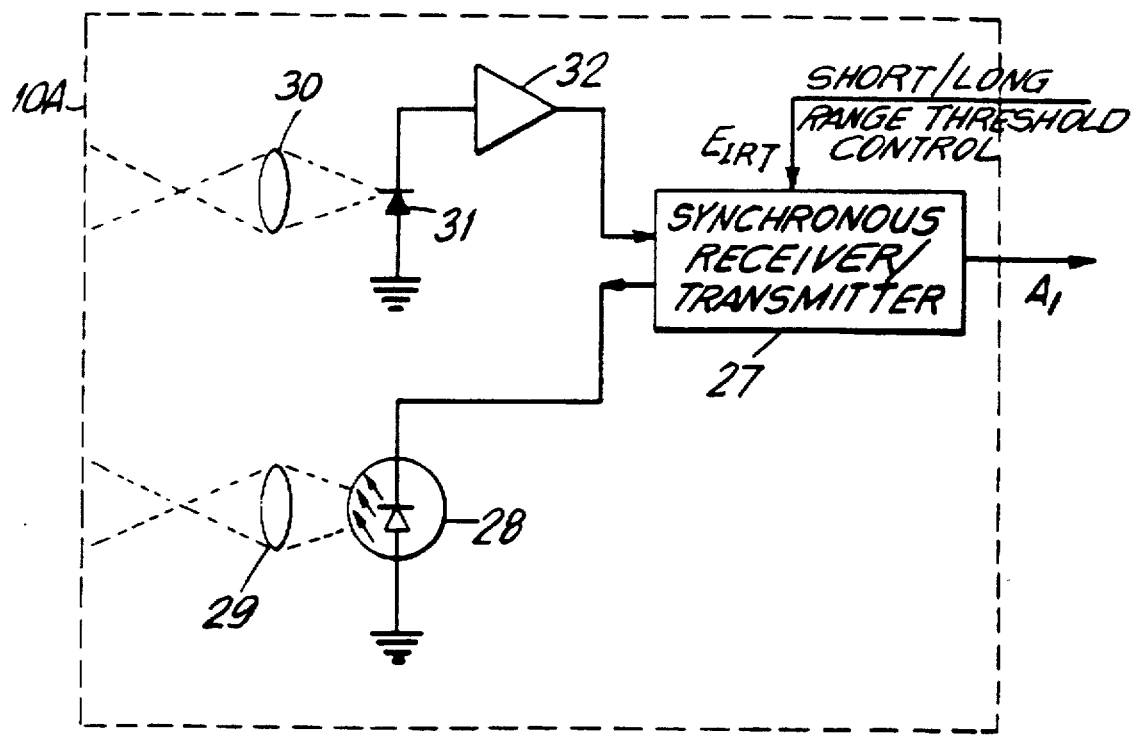
FIG. 5 is a block functional diagram of a first embodiment of the object detection means of the automatic bar code symbol reading device of the present invention.

In FIG. 5, an "active" object detection circuit 10A is shown. In essence, this circuit operates by transmitting an infrared (IR) light signal forwardly into the object detection field. First control activation signal $A_1$ is generated upon receiving a reflection of the transmitted signal off an object within the object detection field. As illustrated, object detection circuit 10A is realized as an IR sensing circuit which comprises a synchronous receiver/transmitter 27 and an infrared LED 28 that generates a 940 nanometer pulsed signal at a rate of 2.0 KHZ. This pulsed IR signal is transmitted through focusing lens 29 to illuminate the object detection field. When an object is present within the object detection field, a reflected pulse signal is produced and focussed through focusing lens 30 onto photodiode 31. Notably, the light collecting (i.e., optical) characteristics of focusing lens 30 will essentially determine the geometric characteristics of the object detection field. Consequently, the optical characteristics of lens 30 will be selected to provide an object detection field which spatially encompasses at least a portion of the scanning field along the operative scanning range of the device. The output of photodiode 31 is converted to a voltage by current-to-voltage amplifier 32, and the output thereof is provided as input to synchronous receiver/transmitter 27 which synchronously compares the received signal with the transmitted signal and determines if an object is present in the object detection field. If so, then synchronous receiver/transmitter 27 produces first control activation signal $A_1=1$, indicative of such condition. Upon generation of first control activation signal $A_1=1$, the system controller will activate the operation of scanning means 11, photoreceiving circuit 12, A/D conversion circuit 13 and bar code presence detection module 14 according to a preprogrammed system control routine, the details of which will be described hereinafter.

Figure 6:
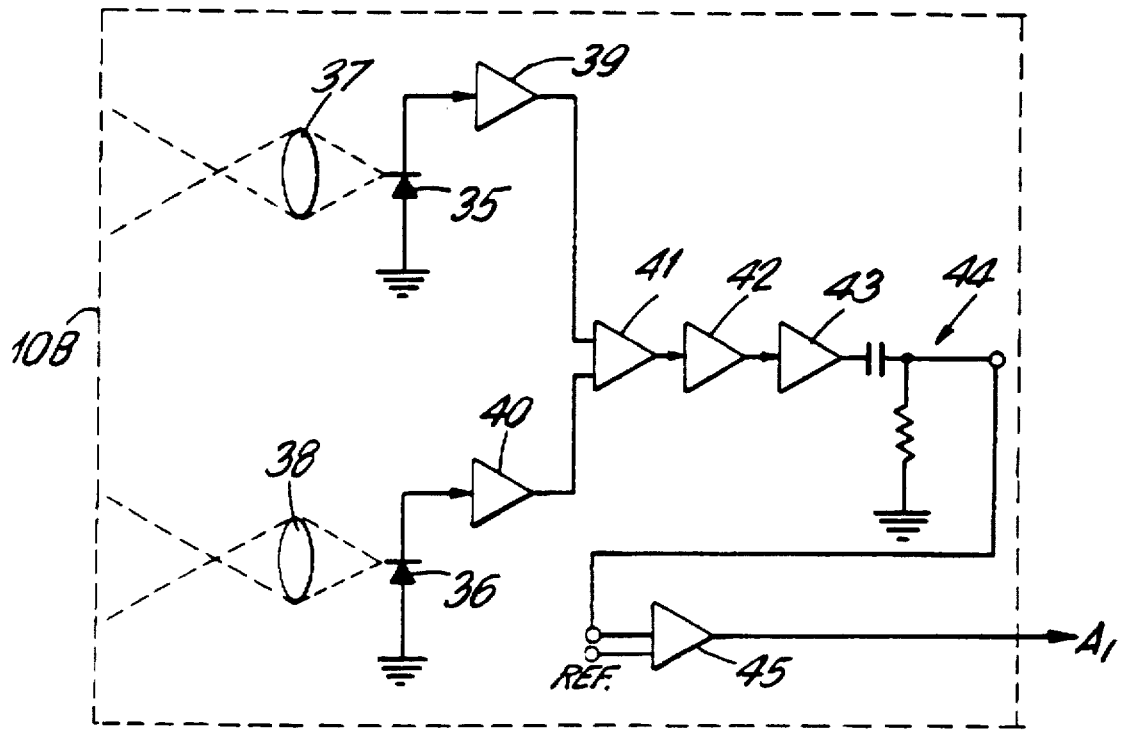
FIG. 6 is a block functional diagram of a second embodiment of the object detection means of the present invention.

In FIG. 6, a passive object detection circuit 10B is shown. In essence this circuit operates by passively detecting ambient light within the object detection field. First control activation signal $A_1$ is generated upon receiving light of different intensity reflected off an object within the object detection field. As illustrated object detection circuit 10B is realized as a passive ambient light detection circuit which comprises a pair of photodiodes 35 and 36, that sense ambient light gathered from two spatially overlapping parts of the object detection field using focussing lenses 37 and 38, respectively. Notably, the optical characteristics of focusing lenses 37 and 38 will essentially determine the geometric characteristics of the object detection field. Consequently, the optical characteristics of these lenses will be selected to provide an object detection field which spatially encompasses at least a portion of the scanning field along the operative scanning range of the device. The output signals of photodiodes 35 and 36 are converted to voltages by current-to-voltage amplifiers 39 and 40 respectively, and are provided as input to a differential amplifier 41. The output of differential amplifier 41 is provided as input to a sample and hold amplifier 42 in order to reject 60 and 120 Hz noise. Output signal of amplifier 42 is provided as input to a logarithmic amplifier 43 to compand signal swing. The output signal of logarithmic amplifier 43 is provided as input to a differentiator 44 and then to a comparator 45. The output of comparator 45 provides first control activation signal $A_1$.

Alternatively, automatic bar code symbol reading device hereof can be readily adapted to sense ultrasonic energy reflected off an object present within the object detection field. In such an alternative embodiment, object detection circuit 10 is realized as an ultrasonic energy sensing mechanism. In housing 5, ultrasonic energy is generated and transmitted forwardly of the housing head portion into the object detection field. Then, ultrasonic energy reflected off an object within the object detection field is detected closely adjacent the transmission window using an ultrasonic energy detector. Preferably, a focusing element is disposed in front of the detector in order to effectively maximize collection of reflected ultrasonic energy. In such instances, the focusing element will essentially determine the geometrical characteristics of the object detection field of the device. Consequently, as with the other above-described object detection circuits, the energy focusing (i.e., collecting) characteristics of the focusing element will be selected to provide an object detection field which spatially encompasses at least a portion of the scan field.

For purposes of illustration, object detection circuit 10A shown in FIG. 5, is provided with two different modes of operation, namely, a long range mode of object detection and a short range mode of object detection. As shown in FIG. 4, these modes are set by the system controller using mode enable signals $E_{IRT}=0$ and $E_{IRT}=1$, respectively. When induced into the long range mode of operation, the IR sensing circuit (i.e., object detection means) will generate first control activation signal $A_1=1$ whenever an object within the object detection field has been detected, despite the particular distance the object is located from the transmission aperture. When induced into the short range mode operation, the IR sensing circuit will generate first activation control signal $A_1=1$ only when an object is detected at a distance within the short range portion of the object detection field. The long range specification for object detection is preselected to be the full or entire range of sensitivity provided by IR sensing circuit 10A (e.g., 0 to about 10 inches), which is schematically indicated in FIGS. 3 and 3A. In the preferred embodiment, the short range specification for object detection is preselected to be the reduced range of sensitivity provided by the IR sensing circuit when mode enable signal $E_{IRT}=1$ is provided to the desensitization port of receiver/transmitter 27 in FIG. 5. In an illustrated embodiment, the short range of object detection is about 0 to about 3 inches or so, as schematically indicated in FIGS. 3 and 3A, to provide CCD-like scanner emulation. As will become apparent hereinafter, the inherently limited depth of field and width of field associated with the short range mode of object detection prevents, in essence, the scanning means 11 from flooding the scan field with scanning light and inadvertently detecting undesired bar code symbols. The particular uses to which object detection range selection can be put, will be described in greater detail hereinafter with reference to FIG. 9 in particular.

As illustrated in FIG. 4, scanning means 11 comprises a light source 47 which, in general, may be any source of intense light suitably selected for maximizing the reflectively from the object's surface bearing the bar code symbol. In the illustrative embodiment, light source 47 comprises a solid-state visible laser diode (VLD) which is driven by a conventional driver circuit 48. In the illustrative embodiment, the wavelength of laser light produced from laser diode 47 is about 670 nanometers. In order to scan the laser beam output from laser diode 47 over a scan field having a predetermined spatial extent in front of the head portion of the housing, a planar scanning mirror 49 can be oscillated back and forth by a stepper motor 50 driven by a conventional driver circuit 51, as shown. However, one of a variety of conventional scanning mechanisms may be alternatively used with excellent results.

To selectively activate laser light source 47 and scanning motor 50, the system controller provides laser diode enable signal $E_L$ and scanning motor enable signal $E_M$ as input to driver circuits 48 and 51, respectively. When enable signal $E_L$ is a logical "high" level (i.e., $E_L=1$), a laser beam is generated, and when $E_M$ is a logical high level the laser beam is scanned through the transmission aperture and across the scan field.

When an object such as product bearing a bar code symbol is within the scan field at the time of scanning, the laser beam incident thereon will be reflected. This will produce a laser light return signal of variable intensity which represents a spatial variation of light reflectivity characteristic of the spaced apart pattern of bars comprising the bar code symbol. Photoreceiving circuit 12 is provided for the purpose of detecting at least a portion of laser light of variable intensity, which is reflected off the object and bar code symbol within the scan field. Upon detection of this scan data signal, photoreceiving circuit 12 produces an analog scan data signal $D_1$ indicative of the detected light intensity.

In the illustrated embodiments, photoreceiving circuit 12 generally comprises scan data collection optics 53, which focus optical scan data signals for subsequent detection by a photoreceiver 54 having, mounted in front of its sensor, a wavelength selective filter 150 which only transmits optical radiation of wavelengths up to a small band above 670 nanometers. Photoreceiver 54, in turn, produces an analog signal which is subsequently amplified by preamplifier 55 to produce analog scan data signal $D_1$. In combination, scanning means 11 and photoreceiving circuit 12 cooperate to generate scan data signals from the scan field, over time intervals specified by the system controller. As will be illustrated hereinafter, these scan data signals are used by bar code presence detection module 14, bar code scan range detection module 15 and symbol decoding module 16.

As illustrated in FIG. 4, analog scan data signal $D_1$ is provided as input to A/D conversion circuit 13. As is well known in the art. A/D conversion circuit 13 processes analog scan data signal $D_1$ to provide a digital scan data signal $D_2$ which resembles, in form, a pulse width modulated signal, where logical "1" signal levels represent spaces of the scanned bar code symbol and logical "0" signal levels represent bars of the scanned bar code symbol. A/D conversion circuit 13 can be realized by any conventional A/D chip. Digitized scan data signal $D_2$ is provided as input to bar code presence detection module 14, bar code scan range detection module 15 and symbol decoding module 16.

The purpose and function of bar code presence detection module 14 is to determine whether a bar code is present in or absent from the scan field over time intervals specified by the system controller. When a bar code symbol is detected in the scan field, the bar code presence detection module 14 automatically generates second control activation signal $A_2$ (i.e., $A_2=1$) which is provided as input to the system controller, as shown in FIG. 4. Preferably, bar code presence detection module 14 is realized as a microcode program carried out by the microprocessor and associated program and buffer memory, described hereinbefore. The function of the bar code presence detection module is not to carry out a decoding process but rather to simply and rapidly determine whether the received scan data signals produced during bar code presence detection, represent a bar code symbol residing within the scan field. There are many ways in which to achieve this through a programming implementation.

In the preferred embodiment the aim of bar code presence detection module 14 is to simply detect a bar code symbol "envelope". This is achieved by first processing a digital scan data signal $D_2$ so as to produce digitized "count" data and digital "sign" data. The digital count data is representative of the measured time interval (i.e., duration) of each signal level between detected signal level transitions which occur in digitized scan data signal $D_2$. The digital sign data, on the other hand, indicates whether the signal level between detected signal level transitions is either a logical "1", representative of a space, or a logical "0", representative of a bar within a bar code symbol. Using the digital count and sign data, the bar code presence detection module then determines in a straightforward manner whether or not the envelope of a bar code symbol is represented by the collected scan data.

When a bar code symbol envelope is detected, the bar code symbol presence detection module provides second control activation signal $A_2=1$ to the system controller. As will be described in greater detail hereinafter, second control activation signal $A_2=1$ causes the device to undergo a transition from the bar code presence detection state to the bar code symbol reading state.

Similar to the object detection circuit described above, the bar code presence detection module is provided with two different modes of operation, namely, a long range mode of bar code presence detection and a short range mode of bar code presence detection. As shown in FIG. 4, these modes are set by the system controller using mode select enable signals $E_{IRT}=0$ and $E_{IRT}=1$, respectively. When induced into the long range mode of operation, the bar code presence detection module will generate second control activation signal $A_2=1$ whenever the envelope of a bar code symbol has been detected, despite the particular distance the bar code is from the transmission aperture. When induced into the short range mode of operation, the bar code presence detection module will generate second control activation signal $A_2=1$ when the envelope of a bar code symbol has been detected and only if the associated count (i.e., timing) data indicates that the detected bar code resides within the short range predetermined for bar code presence detection. Notably, similar to long range specification in connection with object detection, long range specification for bar code presence detection is preselected to be the entire operative scanning range available to the device. In an illustrated embodiment, this range can be from about 0 to about 10 inches from the transmission aperture, depending on the optics employed in the scanning means. This range is schematically indicated in FIGS. 3 and 3A. In the preferred embodiment, short range specification for bar code presence detection is preselected to be the same range selected for short range object detection (e.g., approximately 0 to about 3 inches from the transmission aperture), as indicated in FIGS. 3 and 3A. As will become apparent hereinafter, the inherently limited depth of field and width of field associated with the short range mode of bar code symbol detection prevents scanning means 11 and bar code symbol detection module 14 from actuating the reading of undesired bar code symbols in the scan field.

Unlike the bar code symbol presence detection module, the purpose and function of the bar code scan range detection module is not to detect the presence of a bar code symbol in the scan field, but rather to determine the range that a detected bar code symbol resides from the transmission aperture of the bar code symbol reading device. This data processing module operates upon digitized scan data signal $D_2$ collected from a bar code symbol which has been previously detected by the bar code symbol presence detection module.

In the preferred embodiment, bar code scan range detection module 15 analyzes digital count data produced by the bar code presence detection module, and determines at what range (i.e., distance) a detected bar code symbol resides from the transmission aperture. This determination then permits the scan range detection module to determine whether the detected bar code symbol is located within the prespecified long or short range of the scan field, as measured from the transmission aperture. As will be explained hereinafter in greater detail, this information is used by the bar code presence detection module (i.e., when induced into its short range mode of operation), to determine whether second control activation signal $A_2=1$ should be provided to the system controller. Upon the occurrence of this event, the bar code symbol reading device is caused to undergo a state transition from bar code symbol presence detection to bar code symbol reading.

The function of symbol decoding module 16 is to process, scan line by scan line, the stream of digitized scan data $D_2$, in an attempt to decode a valid bar code symbol within a predetermined time period allowed by the system controller. When the symbol decoding module successfully decodes a bar code symbol within the predetermined time period, symbol character data $D_3$ (typically in ASCII code format) is produced corresponding to the decoded bar code symbol. Thereupon a third control activation signal $A_3=1$ is produced by the symbol decoding module and is provided to the system controller in order to perform its system control functions.

Figure 8A:
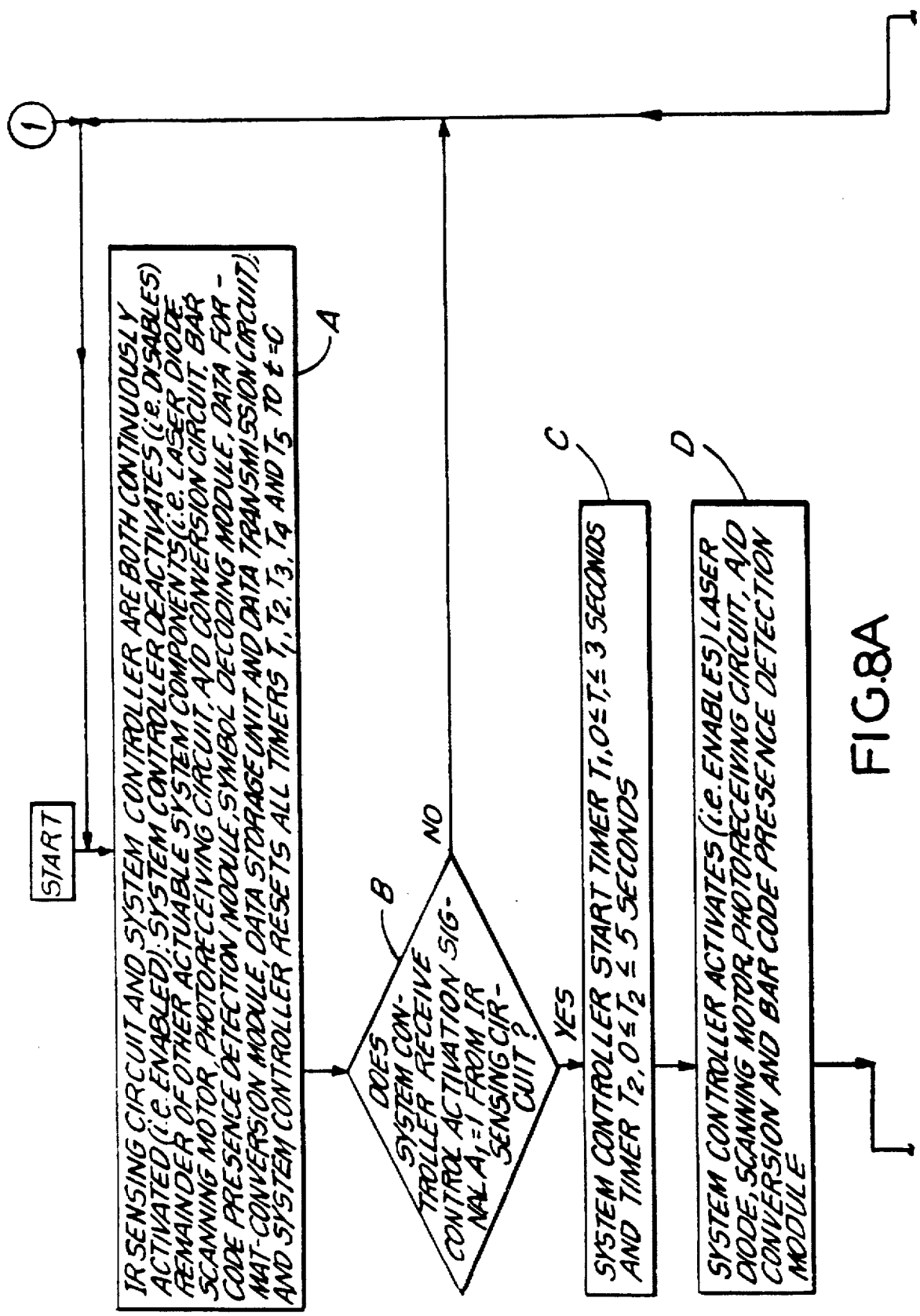
FIGS. 8A to 8B, taken together, show a high level flow chart of a system control program (i.e., Main System Control Routine No. 1), illustrating various courses of programmed system operation that the automatic bar code symbol reading device of the illustrative embodiment may undergo.
Figure 8B:
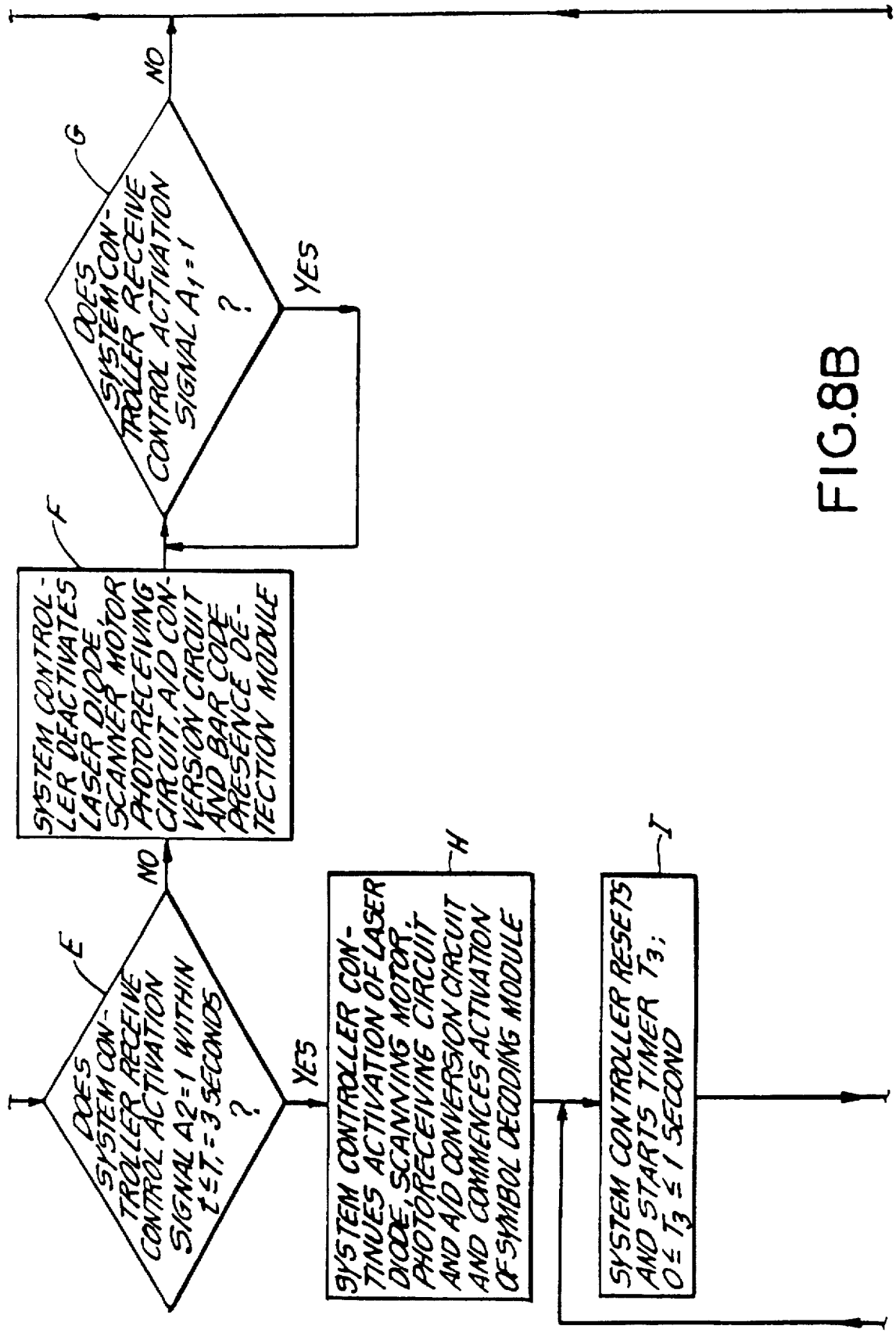
Figure 8D:
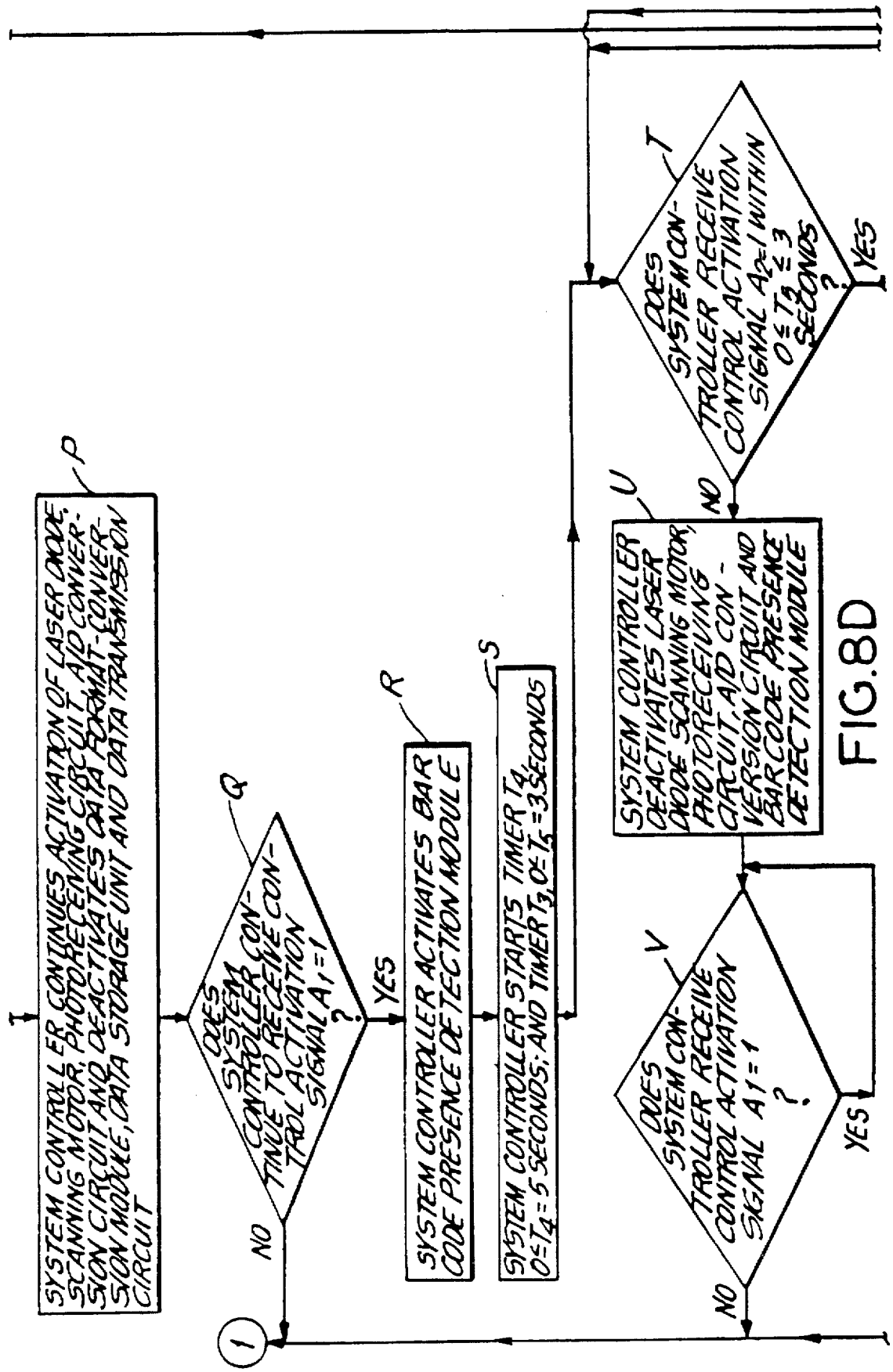
Figure 8E:
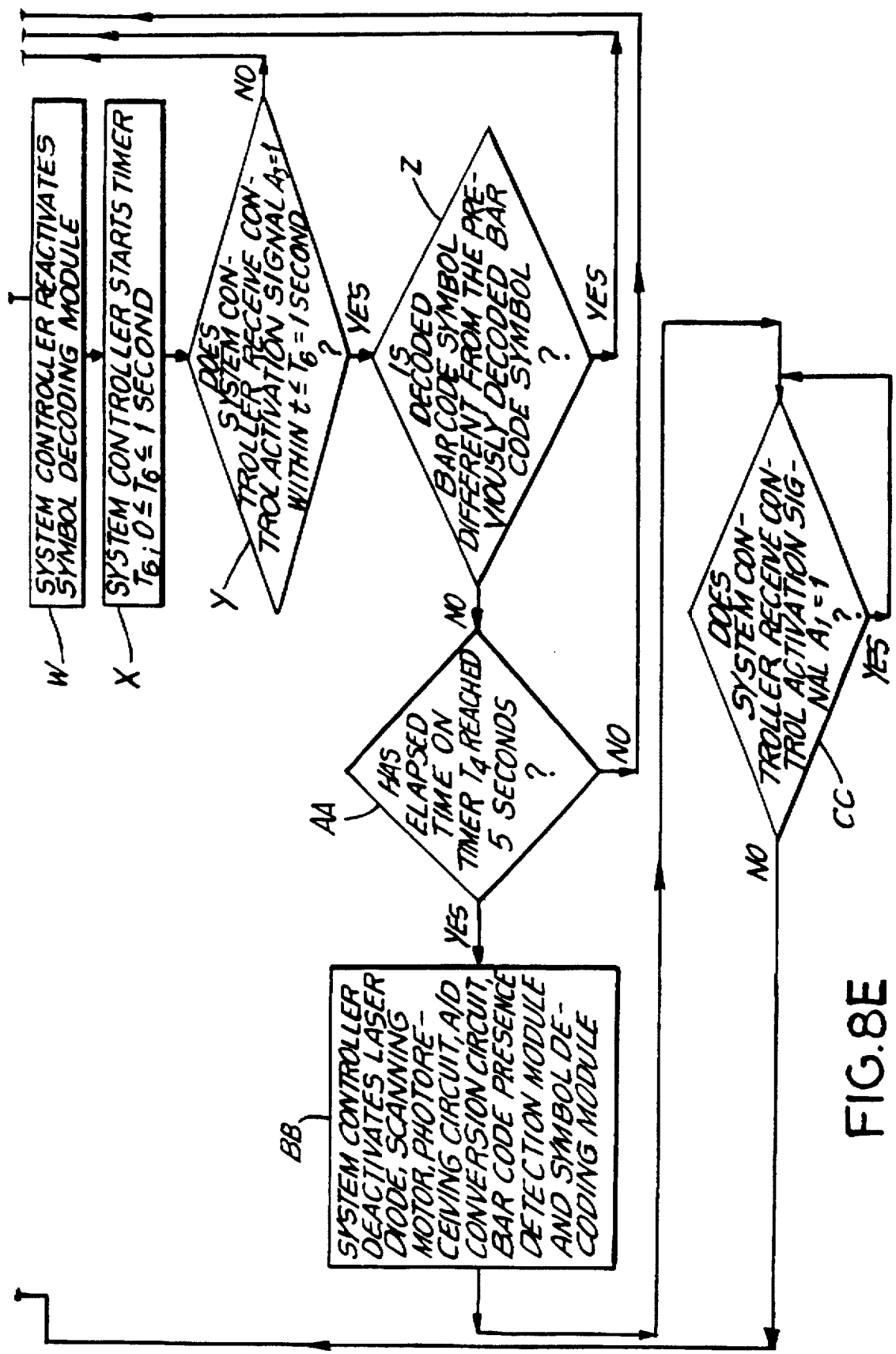

As will be illustrated hereinafter with reference to FIGS. 8 to 8E, the system controller generates and provides enable signals $E_{FC}$, $E_{DS}$ and $E_{DT}$ to data format conversion module 17, data storage unit 18 and data transmission circuit 19, respectively, at particular stages of its control program. As illustrated, symbol decoding module 16 provides symbol character data $D_3$ to data format module 17 to convert data $D_3$ into two differently formatted types of symbol character data, namely $D_4$ and $D_5$. Format-converted symbol character data $D_4$ is of the "packed data" format, particularly adapted for efficient storage in data storage unit 18. Format-converted symbol character data $D_5$ is particularly adapted for data transmission to data collection and storage device 3, or a host device such as, a computer or electronic cash register. When symbol character data $D_4$ is to be converted into the format of the user's choice (based on a selected option mode), the system controller will generate and provide enable signal $E_{DS}$ to data storage unit 18, as shown in FIG. 4. Similarly, when format converted data $D_5$ is to be transmitted to a host device, the system controller will generate and provide enable signal $E_{DT}$ to data transmission circuit 19. Thereupon, data transmission circuit 19 transmits format-converted symbol character data $D_5$ to data collection device 3, via the data transmission lines of flexible connector cable 4.

In order to select either the long or short range mode of object (and/or bar code symbol presence detection), bar code symbol reading device 2 is provided with both manual and automated mechanisms for effectuating such selections.

In the manual mechanism, a manual switch (e.g., step button) 21 is mounted onto the top surface of the handle portion of the housing, so that long and short range modes of object detection can be simply selected by depressing this switch with ones thumb while handling the bar code reading device. The switch generates and provides mode activation signal $A_4$ to the system controller, which in turn generates the appropriate mode enable signal $E_{IRT}$.

Figure 7A:
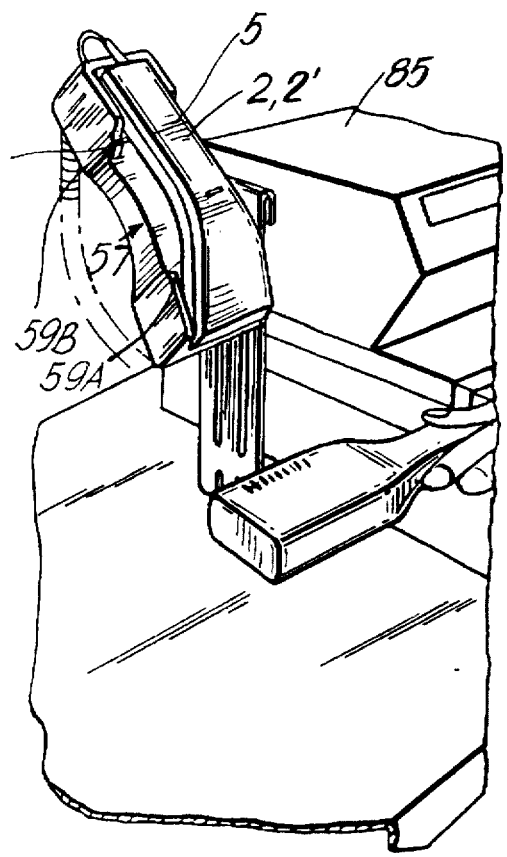
FIG. 7A through 7C show the automatic bar code reading device being used in two different modes of programmed object and bar code presence detection.
Figure 7B:
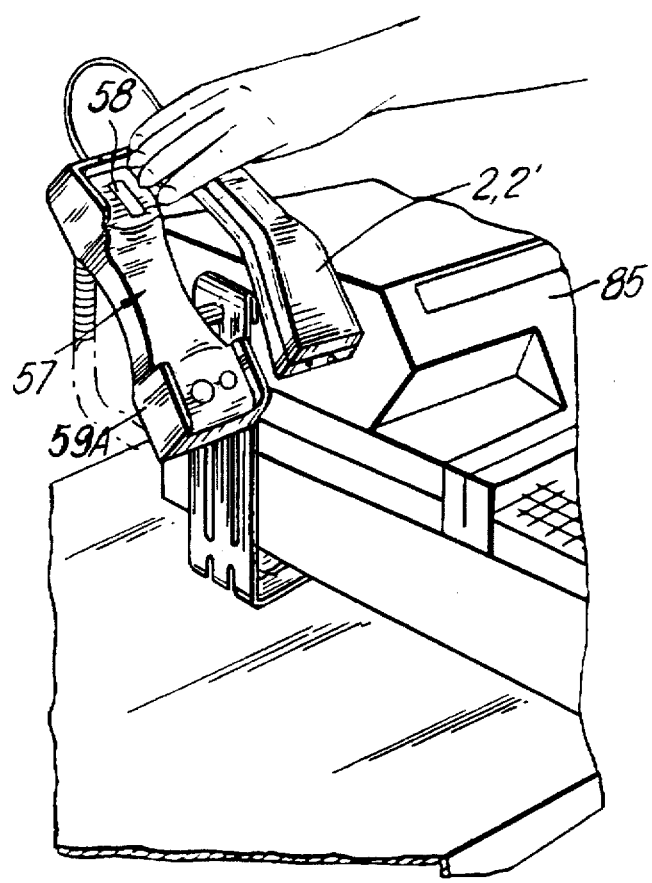
Figure 7C:
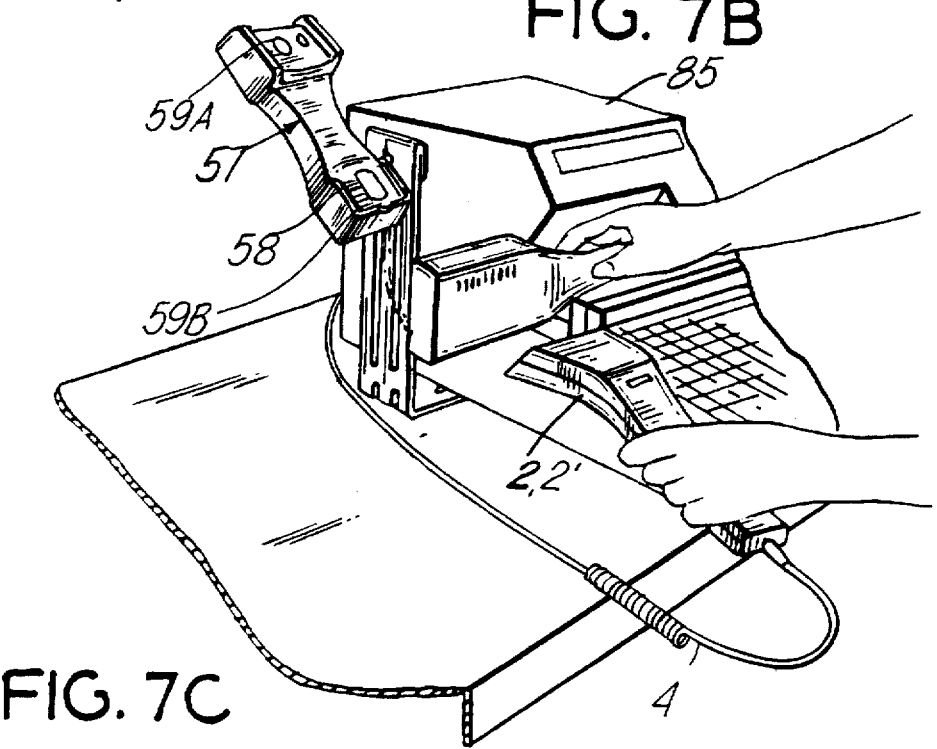

In the automated mechanism, housing support stand detection means 20, realized as a magnetic field sensing circuit, is operably associated with the system controller to automatically generate mode activation signal $A_4$, when the hand-holdable housing is not, for example, being supported within a housing support stand 57 which bears a permanent magnetic 58 disposed in proximity with the housing support surfaces 59A and 59B, illustrated in FIGS. 7A to 7C. Preferably, a visual indicator light is provided to the housing to visually indicate the particular mode which has been selected manually or automatically.

In general, magnetic sensing circuit 20 comprises a magnetic flux detector 60, a preamplifier and a threshold detection circuit. Magnetic flux detector 60 produces as output an electrical signal representative of the intensity of detected magnetic flux density in its proximity. When housing 5 is placed in housing support stand 57, as shown in FIG. 7A, magnetic flux detector 60 will be in position to detect flux from permanent magnet 58. The produced electrical signal is amplified by the preamplifier whose output is compared to a predetermined threshold maintained in the threshold detector circuit. If the intensity of the detected magnetic flux exceeds the threshold, long-range mode activation signal $A_4=1$ is provided to the system controller.

As illustrated in FIG. 2, magnetic flux detector 60 is mounted to the rearward underside surface of the handle portion of the housing. In this illustrated embodiment, a ferrous bar 61 is mounted interiorly to the underside surface of the housing handle portion as shown. This arrangement facilitates releasable magnetic attachment of the hand-holdable housing to magnetic bar 58 fixedly installed in housing support stand 57. Preferably, a hole 62 is drilled through ferrous bar 61 to permit installation of magnetic flux detector 60 so that magnetic flux emanating from magnetic bar 58 is detectable when the housing is positioned within housing support stand 57, as shown in FIG. 7A. In this configuration, magnetic flux detector 60 is in proximity with magnetic bar 58 and long range mode activation signal $A_4=1$ is produced and provided to the system controller. In response, the system controller enables long range object detection (i.e., $E_{IRT}=0$) when the hand-holdable housing is removed from the housing support stand 57 as shown in FIG. 7B, the magnetic flux from magnetic bar 58 is no longer sufficient in strength to produce long range mode activation signal $A_4=1$; instead, short range mode activation signal $A_4=0$ is produced and provided to the system controller. In response, the system controller enables short range object detection (i.e., $E_{IRT}=1$), as illustrated in FIG. 7C.

It is understood that there are a variety of way in which to configure the above described system components within the housing of the automatic bar code symbol reading device, while successfully carrying out of functions of the present invention. In FIGS. 2 and 2A, one preferred arrangement is illustrated.

In FIG. 2A, the optical arrangement of the system components is shown. Specifically, visible laser diode 47 is mounted in the rear corner of circuit board 64 installed within the head portion of the housing. A stationary concave mirror 53 is mounted centrally at the front end of circuit board 63, for primarily collecting laser light. Notably, the height of concave mirror 53 is such not to block transmission aperture 6. Mounted off center onto the surface of concave mirror 53, is very small second mirror 64 for directing the laser beam to planar mirror 49 which is connected to the motor shaft of a scanning motor 50, for joint oscillatory movement therewith. As shown, scanning motor 50 is mounted centrally at the rear end of circuit board 63. In the opposite rear corner of circuit board 63, photodetector 54 is mounted.

In operation, laser diode 47 adjacent the rear of the head portion, produces and directs a laser beam in a forward direction to the small stationary mirror 64 and is reflected back to oscillating mirror 49. Oscillating mirror 49 scans the laser beam over the scan field. The returning light beam, reflected from the bar code symbol, is directed back to oscillating mirror 49, which also acts as a collecting mirror. This oscillating mirror then directs the beam to stationary concave mirror 53 at the forward end of the housing head portion. The beam reflected from the concave mirror 53 is directed to photodetector 54 to produce an electrical signal representative of the intensity of the reflected light.

In front of stationary concave mirror 53, IR LED 28 and photodiode 31 are mounted to circuit board 63, in a slightly offset manner from longitudinal axis 9 of the head portion of the housing. Apertures 65 and 66 are formed in opaque portion 7B of the housing below the transmission aperture, to permit transmission and reception of IR type object sensing energy, as hereinbefore described. In order to shield IR radiation from impinging on photodiode 31 via the housing, a metallic optical tube 67 having an aperture 68 encases photodiode 31. By selecting the size of aperture, the placement of photodiode 31 within optical tube 67 and/or the radiation response characteristics of the photodiode, desired geometric characteristics for the object detection field can be achieved, as described hereinbefore. To prevent optical radiation slightly below 670 nanometers from entering the transmission aperture 6, a plastic filter lens 69 is installed over the transmission aperture for transmitting only optical radiation having wavelengths from slightly below 670 nanometers, and thus blocking the transmission of light having wavelengths below this range, from passing through the light transmission aperture. Notably, in this way the combination of filter lens 69 at the transmission aperture and wavelength selective filter 150 before photoreceiver 54 cooperate to form a narrow band-pass optical filter having a center wavelength $\lambda_c=670$ nanometers, which is located in the visible band of the electromagnetic spectrum. This arrangement provides improved signal-to-noise ratio for detected scan data signals $D_1$.

Having described the detailed structure and internal functions of automatic bar code symbol reading device 2 of the first illustrative embodiment of the present invention, the operation of the system controller thereof will now be described while referring to Blocks A to CC in FIGS. 8A to 8E, and the system block diagram shown in FIG. 4.

Beginning at the START block of Main System Control Routine No. 1 and proceeding to Block A, bar code symbol reading device 2 is initialized. This involves continuously activating (i.e., enabling) IR sensing circuit 10A and the system controller. The system controller, on the other hand, deactivates (i.e., disables) the remainder of activatable system components, e.g., laser diode 47, scanning motor 50, photoreceiving circuit 12, A/D conversion circuit 13, bar code presence detection module 14, bar code scan data range detection module 15, symbol decoding module 16, data format conversion module 17, data storage unit 18, and data transmission circuit 19. All timers $T_1$, $T_2$, $T_3$, $T_4$ and $T_5$ (not shown) maintained by the system controller are reset to t=0.

Proceeding to Block B, the system controller checks to determine whether control activation signal $A_1=1$ is received from IR sensing circuit 10A. If this signal is not received, then the system controller returns to the START block. If signal $A_1=1$ is received, indicative that an object has been detected within the object detection field, then the system controller proceeds to Block C, at which timer $T_1$ is started and is permitted to run for a preset time period, e.g., $0 \leq T_1$, $\leq 3$ seconds, and timer $T_2$ is started and permitted to run for a preset time period $0 \leq T_2 \leq 5$ seconds.

Proceeding to Block D, the system controller activates laser diode 47, scanning motor 50, photoreceiving circuit 12, A/D conversion circuit 13 and bar code presence detection module 14 in order to collect and analyze scan data signals for the purpose of determining whether or not a bar code is within the scan field. Then, at Block E, the system controller checks to determine whether control activation signal $A_2=1$ is received from bar code presence detection module 14 within time period $1 \leq T_1 \leq 3$ seconds. If activation control signal $A_2$, is not received within this period, indicative that a bar code is not within the scan field, then the system controller proceeds to Block F. At Block F, the system controller deactivates laser diode 47, scanning motor 50, photoreceiving circuit 12, A/D conversion circuit 13 and bar code presence detection module 14. Then the system controller remains at Block C until it receives control activation signal $A_1=0$ from IR sensing circuit 10A, indicative that the object is no longer in the object detection field. When this condition exists, the system controller returns to the START block.

If, however, the system controller receives control activation signal $A_2=1$ within time period $0 \leq T_1 \leq 3$ seconds, indicative that a bar code has been detected, then the system controller proceeds to Block H. As will be described hereinafter, this represents a state transition from bar code presence detection to bar code reading. Proceeding to Block H, the system controller continues activation of laser diode 47, scanning motor 50, photoreceiving circuit 12, and A/D conversion circuit 13, and commences activation of symbol decoding module 14. At this stage, fresh bar code scan data is collected and is subject to decode processing. At essentially the same time, at Block I, the system controller starts timer $T_3$ to run for a time period $0 \leq T_3 \leq 1$ second.

As indicated at Block J, the system controller checks to determine whether control activation signal $A_3=1$ is received from the symbol decoding module 16 within $T_3=1$ second, indicative that a bar code symbol has been successfully read (i.e., scanned and decoded) within the allotted time period. If control activation signal $A_3$ is not received within the time period $T_3=1$ second, then at Block K the system controller checks to determine whether control activating signal $A_2=1$ is received within time period $0 \leq T_3 \leq 3$ seconds. If a bar code symbol is not detected within this time period, then the system controller proceeds to Block L to deactivate laser diode 47, scanning motor 50, photoreceiving circuit 12, A/D conversion circuit 13, bar code presence detection module 14 and symbol decoding module 16. Notably, this event causes a state transition from bar code reading to object detection. Thereafter, at Block M the system controller remains in the object detection state awaiting control activation signal $A_1=0$, indicative that an object is no longer in the object detection field. When this condition exists, the system controller returns to the START block, as shown.

If at Block K, however, the system controller receives control activation signal $A_2=1$, indicative that a bar code once again is within the scan field then the system controller checks to determine whether time period $T_2$ has elapsed. If it has, then the system controller proceeds to Block L and then to the START block by way of Block M. If, however, time period $0 \leq T_2 \leq 5$ seconds has not elapsed, then the system controller resets timer $T_3$ to run once again for a time period $0 \leq T_3 \leq 1$ second. In essence, this provides the device at least another opportunity to read a bar code present within the scan field when the system controller is at control Block J.

Upon receiving control activation signal $A_3=1$ from symbol decoding module 16, indicative that a bar code symbol has been successfully read, the system controller proceeds to Block O. At this stage of the system control process, the system controller continues to activate laser diode 47, scanning motor 50, photoreceiving circuit 12 and A/D conversion circuit 13, while deactivating symbol decoding module 16 and commencing activation of data format conversion module 17, data storage unit 18 and data transmission circuit 19. These operations maintain the scanning of the laser beam across the scan field, while symbol character data is appropriately formatted and transmitted to data collection device 3, or a host device, by a conventional data communication process well known in the art.

After transmission of symbol character data to the host device is completed, the system controller enters Block P and continues activation of laser diode 47, scanning motor 50, photoreceiving circuit 12 and A/D conversion circuit 13, while deactivating symbol decoding module 16, data format-conversion module 18, data storage unit 18 and data transmission circuit 19. To detect the continued presence of an object within the object detection field, the system controller checks at Block Q whether control activation signal $A_1=1$ is received from IR sensing circuit 10A. If $A_1=0$, indicative that the object is no longer in the object detection field, then the system controller returns to the START Block. If control activation signal $A_1=1$ is received, then at Block R the system controller activates bar code presence detection module 14. These events represent once again a state transition from object detection to bar code symbol presence detection.

At Block S, the system controller starts timer $T_4$ to run for a time period $0 \leq T_4 \leq 5$ seconds, and timer $T_5$ to run for a time period $0 \leq T_5 \leq 3$ seconds. Then to determine whether a bar code symbol has been detected within the scan field, system controller proceeds to Block T to check whether control activation signal $A_2=1$ is received. If this signal is not received with the time period $0 \leq T_5 \leq 5$ seconds, indicative that no bar code symbol is present in the scan field, the system controller proceeds to Block U, at which it deactivates laser diode 47, scanning motor 50, photoreceiving circuit 12, A/D conversion circuit 13 and bar code presence detection module 14. Thereafter, the system controller remains at Block V until the object leaves the object detection field (i.e., receives control activation signal $A_1=0$), at which time the system controller returns to the START block, as shown.

If, however, at block T control activation signal $A_2=1$ is received, indicative that a bar code symbol has been detected in the scan field, the system controller proceeds through blocks W and X to reactivate the symbol decoding module and start timer $T_6$ to run for a time period $0 \leq T_6 \leq 1$ second. These events represent a state transition from bar code symbol presence detection to bar code symbol reading. At block Y, the system controller checks to determine whether control activation signal $A_3=1$ is received from signal decoding module 16 within time period $0 \leq T_6 \leq 1$ second. If a bar code symbol is not successfully read within this 1 second time period, the system controller returns to block T to form a first loop, within which the device is permitted to detect or redetect a bar code symbol within the time period $0 \leq T_4 \leq 5$ seconds. If a bar code symbol is decoded within this time interval, the system controller determines at block Z whether the decoded bar code symbol is different from the previously decoded bar code symbol. If it is different, then the system controller returns to block O as illustrated, to format and transmit symbol character data as described hereinabove.

If, however, the decoded bar code symbol is not different than the previously decoded bar code symbol, then at block AA the system controller checks to determine whether timer $T_4$ has lapsed. If it has not lapsed, the system controller returns to block T to form a second loop, within which the device is permitted to detect or redetect a bar code symbol in the scan field and then successfully read a valid bar code symbol within the set time interval $0 \leq T_4 \leq 5$ seconds. If, however, timer $T_4$ lapses, then the system controller proceeds to block BB at which the system controller deactivates laser diode 47, scanning motor 50, photoreceiving circuit 12, A/D conversion circuit 13, bar code presence detection module 14, and symbol decoding module 16. Thereafter, the system controller remains at block CC until control activation signal $A_1=0$ is received from IR sensing circuit 10A, indicative that the object detection field is free of any objects. At this stage, the system controller returns to the START block, as shown in FIG. 8B.

The operation of automatic bar code symbol reading device 2 has been described in connection with Main System Control Routine No. 1 which uses control activation signals $A_1$, $A_2$ and $A_3$. This system control routine operates on two basic assumptions concerning IR sensing circuit 10A and bar code symbol presence detection module 14. Specifically, Main System Control Routine No. 1 assumes that the IR sensing circuit produces control activation signal $A_1=1$ whenever an object is detected anywhere within the operative detection range of the object detection field. It also assumes that the bar code symbol presence detection module produces control activation signal $A_2=1$ whenever a bar code symbol is detected anywhere within the operative scanning range of the scan field. These assumptions cause state transitions in the operation of the automatic bar code symbol reading device, when otherwise they may not be desired in particular applications.

For example, in some applications it may not be desirable to automatically advance the symbol reading device to its bar code presence detection state until an object bearing a bar code is within the short range of the object detection field, as hereinbefore described. Also, it may not be desirable to automatically advance bar code symbol reading state until a detected bar code symbol is located within the short range of the scanning field as hereinbefore described. In some instances, it may be desirable to condition both (i) object detection to bar code symbol presence detection transitions as well as (ii) bar code symbol presence detection to bar code symbol reading transitions. Yet, in other instances, it may only be desirable to condition one of operation state transitions.

Figure 9B:
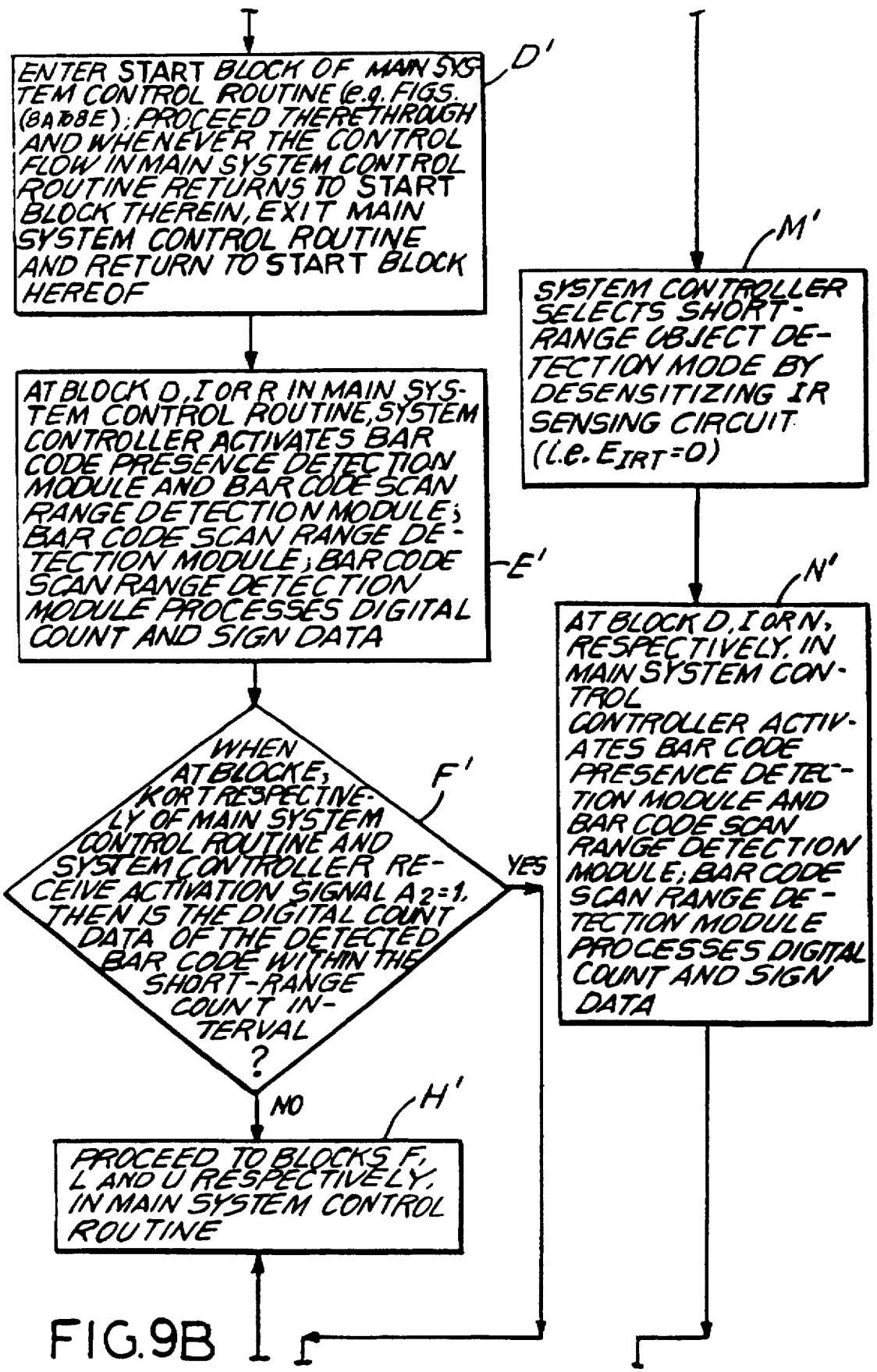
Figure 9C:
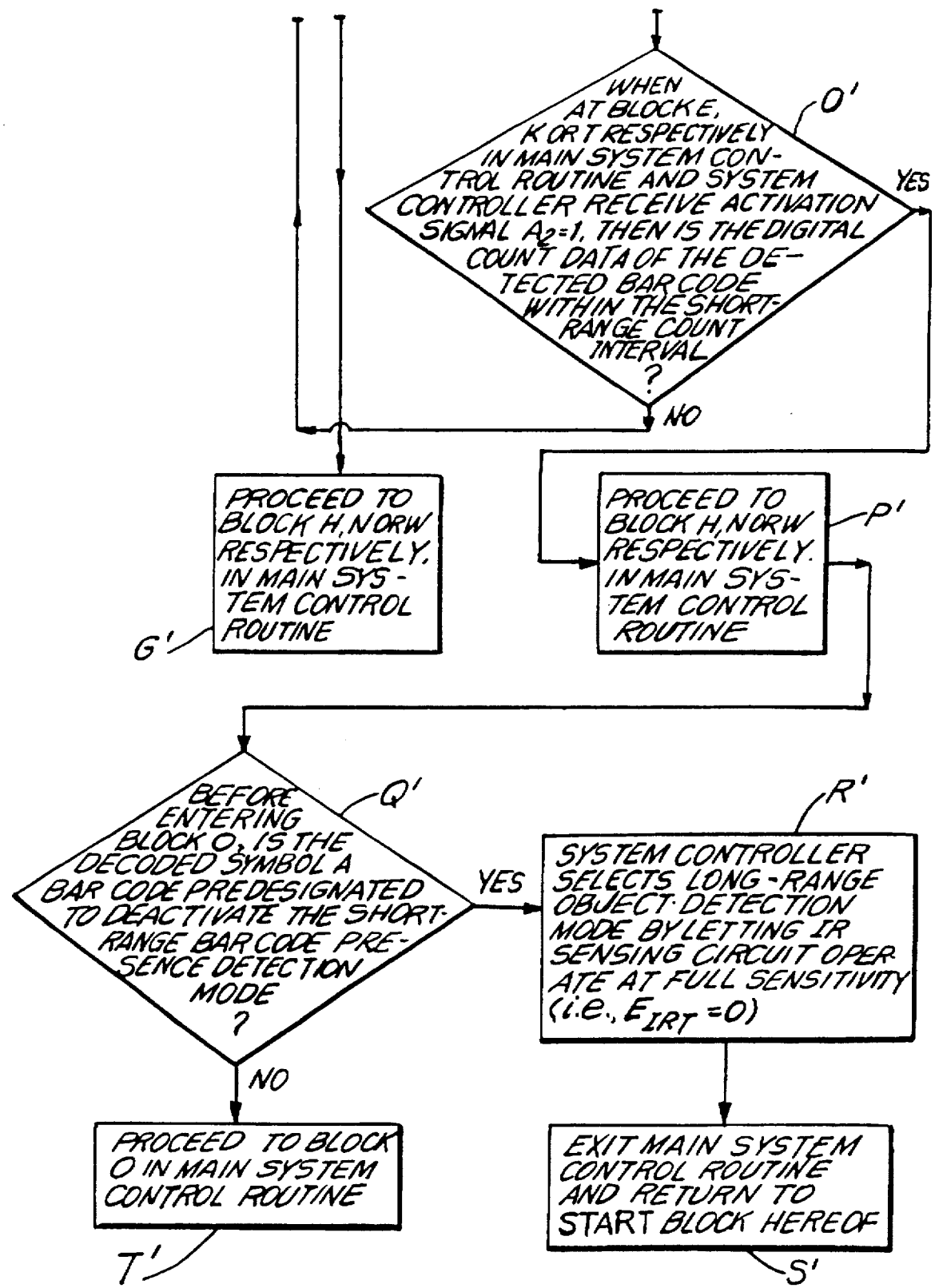

FIGS. 9A and 9B illustrate a System Control Routine which provides the automatic bar code symbol reading devices of the present invention with range selection capabilities for both object and bar code presence detection. Two of the diverse functions provided, when the system controller runs this System Control Routine, are illustrated in FIGS. 7A through 7C. Notably, the System Control Routine of FIGS. 9A and 9B utilizes Main System Control Routine No. 1 of FIGS. 8A and 8B which has been described above. It is understood, however, that it may be adapted for use with other system control programs, such as Main System Control Routine No. 2 of FIGS. 12A and 12B, to be described hereinafter in connection with the second illustrative embodiment.

Beginning at the START block and proceeding to block A' of FIG. 9A, the system controller initially selects the long range object detection mode by letting the IR sensing circuit to operate at full sensitivity (i.e., $E_{IRT}=0$). To determine if the short range mode of object and bar code symbol presence detection has been selected, the system controller proceeds to block B' and determines whether it has received control activation signal $A_4=1$. As described hereinbefore in connection with FIG. 4, activation signal $A_4=1$ can be generated in at least two possible ways. For example, the short range mode of object and bar code presence detection may be manually selected by depressing switch 21 on the housing using the ones thumb. Alternatively, the short range mode may be selected by lifting the device out from housing support stand 57, as illustrated in FIG. 7B. In either case, prior to operating the symbol reading device, either the manual or automatic mechanism for the mode selection is set with the system controller.

If control activation signal $A_4=1$ is received at Block B', then the system controller selects short range object detection by desensitizing the IR sensing circuit. This is achieved by providing mode selection enable signal $E_{IRT}=1$ as hereinbefore described. Then proceeding to Block D', the system controller enters the START block of Main System Control Routine of, for example, FIGS. 8A and 8B. Thereafter, the control flow proceeds as prescribed by the Main System Control Routine No. 1. Notably, whenever the control flow in the Main System Control Routine returns to the START block therein, the system controller will exit Main System Control Routine No. 1 and return to the START block of System Control Routine of FIGS. 9A and 9B.

As illustrated at block E' of FIG. 9A, whenever the control flow is at blocks D, I or R in the Main System Control Routine, the system controller activates bar code presence detection 14 module and bar code scan range detection module 15. Thereafter, while at any one of these control blocks, the bar code scan range detection module processes scan data signal $D_2$ so as to produce digital count and sign data as hereinbefore described. As indicated at block F', an additional condition is placed on control blocks E, K and T in the Main System Control Routine, so that a transition from the bar code presence detection state to the bar code reading state occurs only if (i) the object is detected in the short range portion of the object detection field and (ii) the bar code is detected in the short range portion of the scan field. Specifically, when at any one of such blocks in the Main System Control Routine and the system controller receives control activation signal $A_2=1$, then the system controller will also determine whether the digital count data of the detected bar code is within the short range count interval. If the digital count data produced indicates that the detected bar code symbol is not located within the prespecified short range of the scan field, then as indicated at block H' of FIG. 9B, the system controller proceeds to blocks F, L or U, respectively, in the Main System Control Routine. If, however, the digital count data produced indicates that the detected bar code symbol is located within the short range of the scan field, then as indicated at block G' of FIG. 9A, the system controller proceeds to blocks H, N or W, respectively, in the Main System Control Routine. In such instances, detection of a bar code symbol in the scan field is insufficient to effect a state transition to the bar code reading.

Turning attention to block B' of FIG. 9A, the system controller may not receive control activation signal $A_4=1$ from the IR sensing circuit, as indicated at this block. In some embodiments neither switch 21 or magnetic field sensing circuit 20 may be activated, or provided in the automatic bar code reading device. In such embodiments having short/long range selection capabilities, symbol decoding module 16 can be adapted to recognize predesignated bar code symbols which automatically activate and deactivate long and/or short range modes of object and/or bar code presence detection. As will become apparent hereinafter, this type of automatic mode selection is highly advantageous when reading, for example, bar coded menus and the like.

As indicated at Block I' of FIG. 9A, absent receipt of control activation signal $A_{4A}=1$ at block B, the system controller selects (i.e., maintains) the long range object detection mode by letting IR sensing circuit 10A operate at full sensitivity (i.e., $E_{IRT}=0$). Then at block J', the system controller enters the START block of Main System Control Routine of FIGS. 8A and 8B, as hereinbefore described in connection with block D' of FIG. 9A. As indicated at block K', before entering block O of the Main System Control Routine, the system controller determines whether the successfully read bar code symbol is a bar code which has been predesignated to activate the short range bar code presence detection mode. This achieved by checking whether the system controller receives mode activation signal $A_4=1$ from symbol decoding module 16 as shown in FIG. 4. If mode activation signal $A_4=0$ is received by the system controller, then as indicated at block L' the system controller proceeds to block O of the Main System Control Routine. If, however, mode activation signal $A_4=1$ is, received, then as indicated at block M' the system controller selects the short range mode of object detection by desensitizing IR sensing circuit 10A (i.e., $E_{IRT}=0$). This operation ensures that control activation signal $A_1$ is produced only when an object is detected within the short range of the object detection field, as illustrated in FIGS. 3 and 3A.

As indicated at block N' of FIG. 9A, the short range mode of bar code presence detection is indicated by the system controller by activating both bar code presence detection module 14 and bar code scan range detection module 15 whenever the system controller is at block D, I or R, respectively, in the Main System Control Routine. In this way, the bar code scan range detection module analyzes digital sign and count data from each detected bar code system to determine the range of the detected bar code in the scan field.

As indicated at block O', an additional condition is placed on control blocks E, K and T in the Main System Control Routine. This condition ensures that a transition from the bar code presence detection state to the bar code reading state occurs only if the object is detected in the short range portion of the object detection field and the bar code symbol is detected in the short range portion of the scan field. This is achieved by requiring the system controller to determine whether or not the digital count data of the detected bar code is within the prespecified short range count interval. If the digital count data of the detected bar code symbol is not within the short range count interval, then as indicated at block O', the system controller proceeds to control blocks F, L or U, respectfully, in the Main System Control routein as previously indicated in block H'. If, however, the digital count data is within the prespecified short range count interval, then mode activation control signal $A_{4B}=1$ is provided to the system controller as illustrated in FIG. 4. In this instance, $A_{4A}=1$ and $A_{4B}=1$, and thus bar code presence detection module 14 provides control activation signal $A_2=1$ to the system controller in order to effectuate a transition to the bar code symbol reading state. These events are represented at block P' of FIG. 9A by the system controller proceeding to blocks H, N or Y, respectively, in the Main System Control Routine. Then as indicated at block Q' of FIG. 9B, the system controller checks to determine whether the successfully read bar code symbol is a bar code predesignated to deactivate the short range detection mode. If the read bar code symbol is a short-range mode deactivation bar code, then as indicated at block R', the system controller selects the long range object detection mode by letting IR sensing circuit 10A operate at full sensitivity (i.e., $E_{IRT}=0$). Then, as indicated at block S', system controller exits Main System Control Routine No. 1 and returns to the START block of System Control Routine of FIGS. 9A and 9B. If, however, the read bar code symbol is not a short range mode deactivation bar code, then as indicated at Block T', the system controller proceeds to block O in the Main System Control Routine. The bar code symbol reading device of the present invention will then remain in the short-range detection mode until it reads a short-range mode deactivation symbol.

Referring now to FIGS. 1, and 10 through 13 in particular, the second embodiment of the automatic bar code reading device of the present invention, will be described.

Automatic bar code symbol reading device 2' comprises the identical hand-holdable housing illustrated in FIGS. 1, 3 and 3A and described hereinabove. Thus, similar structure or elements are indicated with like reference numbers throughout these drawings. The object detection and scan fields produced by the device of the second embodiment are essentially identical in the functional sense, although they are different in geometrical terms which will be described below.

As illustrated in FIGS. 10 and 10A, the geometrical characteristics of the object detection field provided in bar code reading device 2' is substantially wider in three-dimensional space that is shown in FIGS. 3 and 3A, while the geometry of the scan field is essentially the same. The reason for the difference in geometry and dimensions of the object detection field in the second illustrative embodiment is attributed to the fact that reflected IR object sensing energy (emitted from centrally disposed IR LED 28) is permitted to pass through IR transparent window 70 and be collected within the head portion of the housing using the same optics employed in the collection of reflected laser light from the scan field. While the width dimensions of the scan field are essentially equal to the width dimensions of the object detection field in this embodiment, the object detection field represented in FIG. 10A has been illustrated slightly narrower strictly for purposes of clarity in exposition.

To more fully appreciate the mechanisms employed in providing the object detection and scan fields of bar code symbol reading device 2', reference is best made to the operative elements within the hand-holdable housing.

Figure 11:
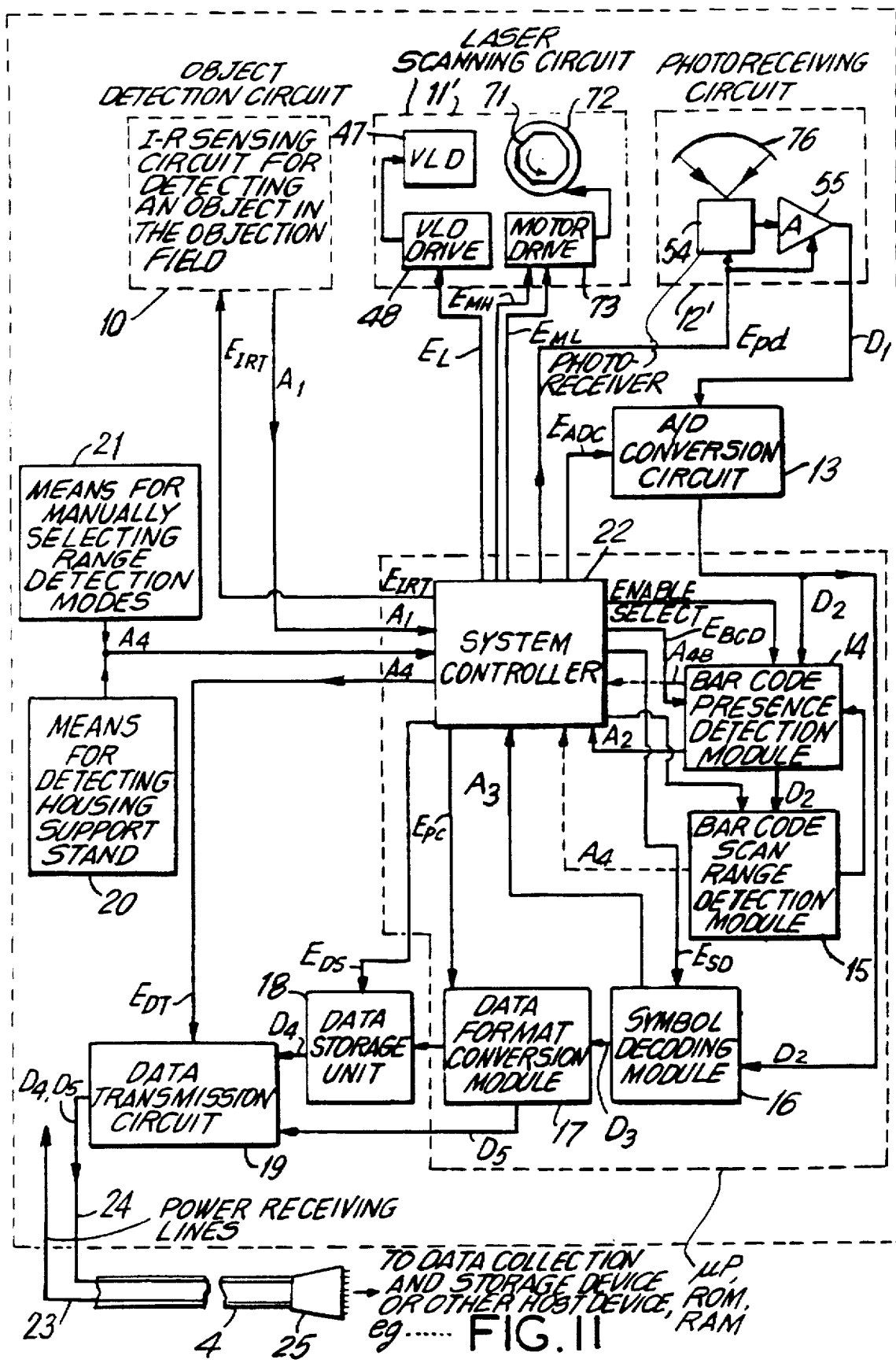
FIG. 11 is a block functional system diagram of the automatic hand-holdable bar code reading device of the second illustrative embodiment of the present invention.

As shown in FIG. 11, bar code symbol reading device of the second illustrative embodiment comprises essentially identical system components used in the first illustrative embodiment schematically represented in FIG. 4. Thus, similar elements are indicated with like reference numbers throughout these drawings. Notably, however, there are several significant structural differences with respect to laser scanning circuit 11' and photoreceiving circuit 12' which will be pointed out below.

As illustrated in FIG. 11, scanning circuit 11' comprises a solid-state visible laser diode 47 which is driven by a conventional VLD driver circuit 48. In order to scan the laser beam output from laser diode 47 over a scan field having a predetermined spatial extent in front of the housing head portion, a polygonal scanning mirror 71 is rotated at either a low or high angular velocity (i.e., speed) by scanning motor 72 driven by a dual speed driver circuit 73, as shown.

To selectively activate laser diode 47, the system controller provides laser enable signal $E_L$ to laser driver circuit 48, whereas to activate scanning motor 72 at high or low speed, the system controller provides scanning motor driver circuit 73 motor enable signals $E_{MH}$ or $E_{ML}$, respectively. With this scanning arrangement, the system controller can selectively operate scanning circuit 11' and photoreceiving circuit 12' in at least two ways. For example, when $E_L=1$ and motor enable signals are $E_{MH}=1$ and $E_{ML}=0$, a laser beam is generated from laser diode 47 and polygonal scanning mirror 71 is rotated at high speed. In response, the laser beam is scanned through the transmission aperture and across the scan field at a scan-line rate proportional to the speed of the scanning motor and the radial distance of the beam from the scanning mirror surface. Alternatively, using this scanning mechanism, polygonal scanning mirror 71 can be rotated at a slow speed while laser diode 47 is deactivated. This can be achieved by the system controller providing laser enable signal $E_L=0$ to laser driver circuit 48' and motor enable signals $E_{MH}=0$ and $E_{ML}=1$ to driver circuit 73. The utility of this latter scanning function will become apparent hereinafter.

In FIG. 10A, the optical arrangement of the system components for the second illustrative embodiment is shown. Specifically, visible laser diode 47 is mounted in the rear corner of circuit board 75, installed within the head portion of the housing. A stationary concave mirror 76 is mounted controlling at the first end of the circuit board, for primarily collecting laser light. Notably, the height of concave mirror 76 is such as not to block transmission aperture 6. Mounted off center onto the surface of concave mirror 76, is a very small second mirror 77 for directing incident laser beam from laser diode 47 to polygonal mirror 71 which is connected to the shaft of scanning motor 72, for joint rotational movement therewith. As shown, scanning motor 72 is mounted centrally at the rear end portion of the circuit board. In the opposite rear corner of the circuit board, photoreceiver 54 and IR detecting photodiode 31 are mounted in a contiguous manner as shown. In front of photoreceiver diode 54 and essentially along the optical axis of concave mirror 76, an optical element 78, such as a concave lens, can be provided to assist concave mirror 76 in focusing collected laser return light onto the photoreceiver. If necessary, lens 78 can be treated so as to filter out IR energy collected through the collection optics of the system. In addition, focusing lens 30 can be mounted in front of IR detecting photodiode 31 to assist concave mirror in focussing collected IR light onto IR diode photodiode 34.

In order to flood the object detection field with IR light, IR LED 28 and lens 29 are mounted centrally in front of concave mirror 76. A circular aperture 79 is formed in front opaque panel 7B below transmission aperture 6.

To appreciate the functionality of the optical arrangement featured in FIG. 10A, its operation will be described below during object detection, as well as bar code symbol detection and reading.

During object detection operations, laser diode 47 will typically be deactivated. However, scanning motor 72 is activated so that polygonal mirror 71 is rotated at low speed. At the same time, IR sensing circuit 10A is activated so that the object detection field is flooded with IR energy. In this way, IR energy reflected off an object and passing through IR transmissive window 70 will be reflected off slowly rotating polygonal mirror 71, directed onto concave mirror 76 and then focused through lens 78 onto IR detecting photo diode 31, illustrated in FIGS. 5 and 10A.

During bar code presence detection and reading operations in the second illustrative embodiment, laser diode 47 and photoreceiving circuit 12' are activated, while scanning motor 72 is driven at high speed. In this way, laser diode 47 produces a laser beam that is directed in a forward direction onto small stationary mirror 77 and is reflected back to rotating polygonal mirror 71. Rotating polygonal mirror 71 scans the laser beam across the scan field. The returning laser light beam reflected from the bar code, is directed back onto rotating polygonal mirror 71 which also acts as a collecting mirror. This rotating mirror directs the beam to stationary concave mirror 76 at the forward end of the housing head portion. The beam reflected from concave mirror 76 is directed to photoreceiver 47 to produce an electrical signal representative of the intensity of the reflected light.

Figure 12B:
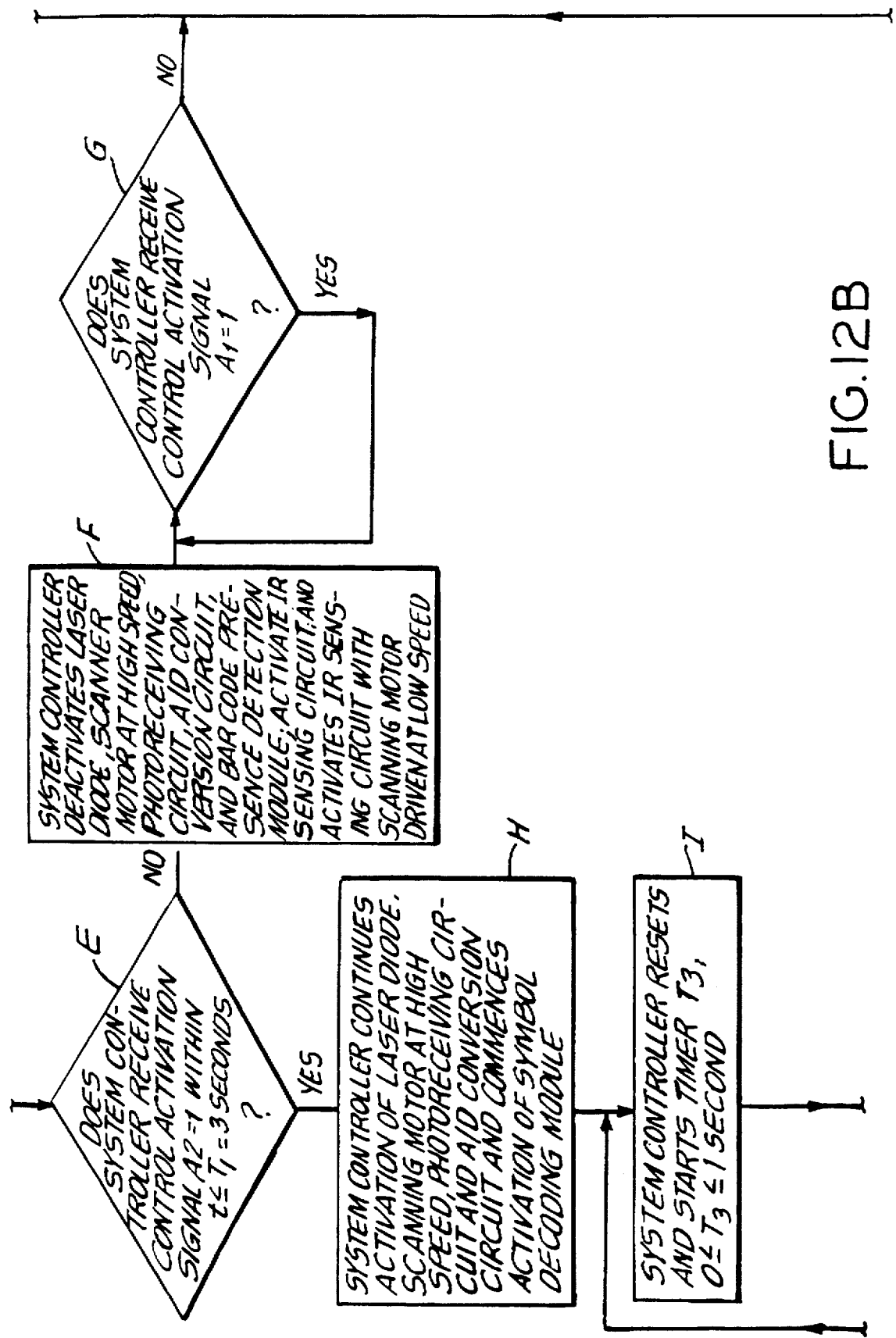
FIGS. 12A to 12B, taken together, show a high level flow chart of a system control program (i.e., Main System Control Routine No. 2), illustrating various courses of automatic programmed system operation that the automatic bar code symbol reading device of second illustrative embodiment may undergo.
Figure 12C:
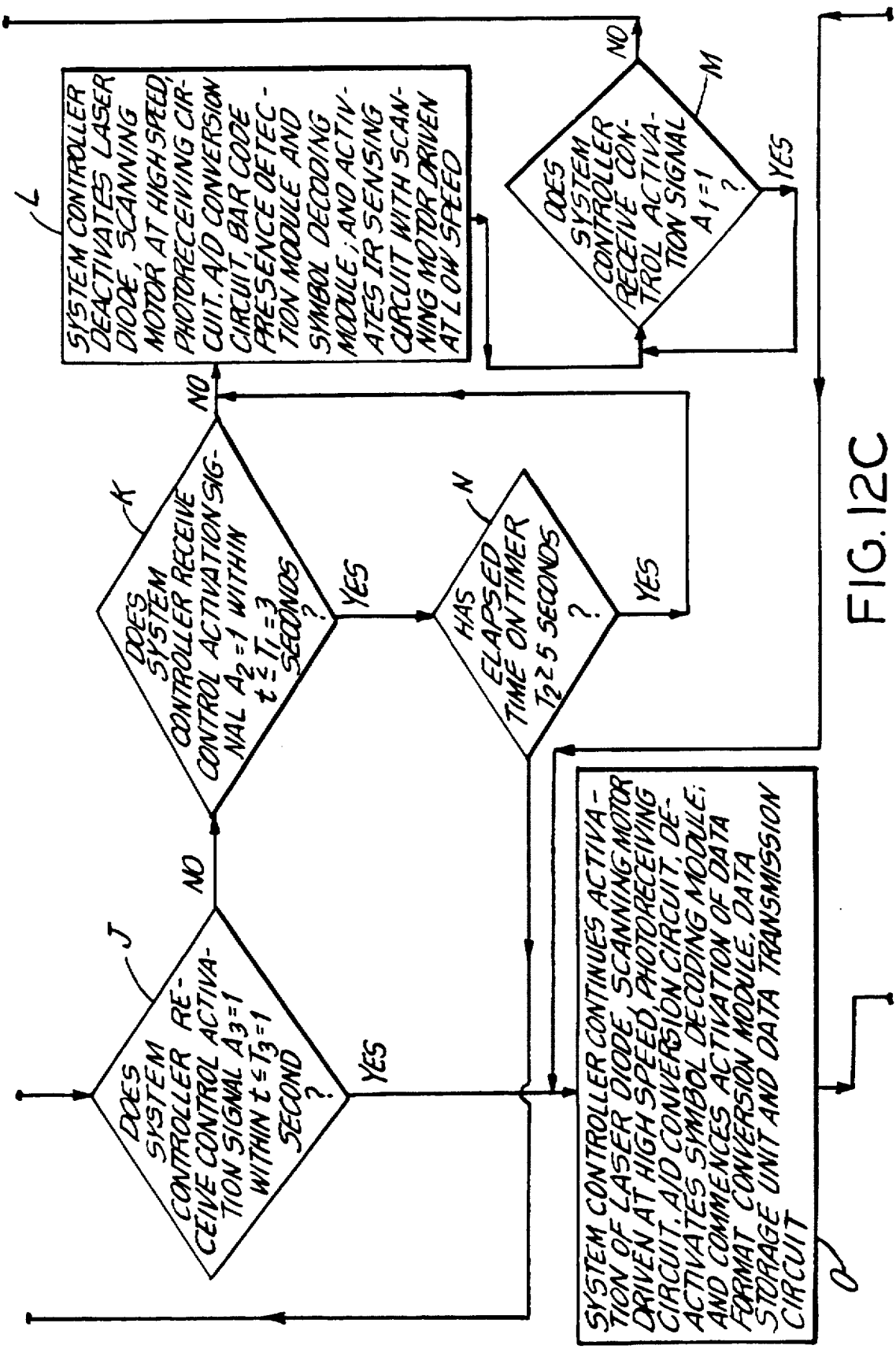
Figure 12D:
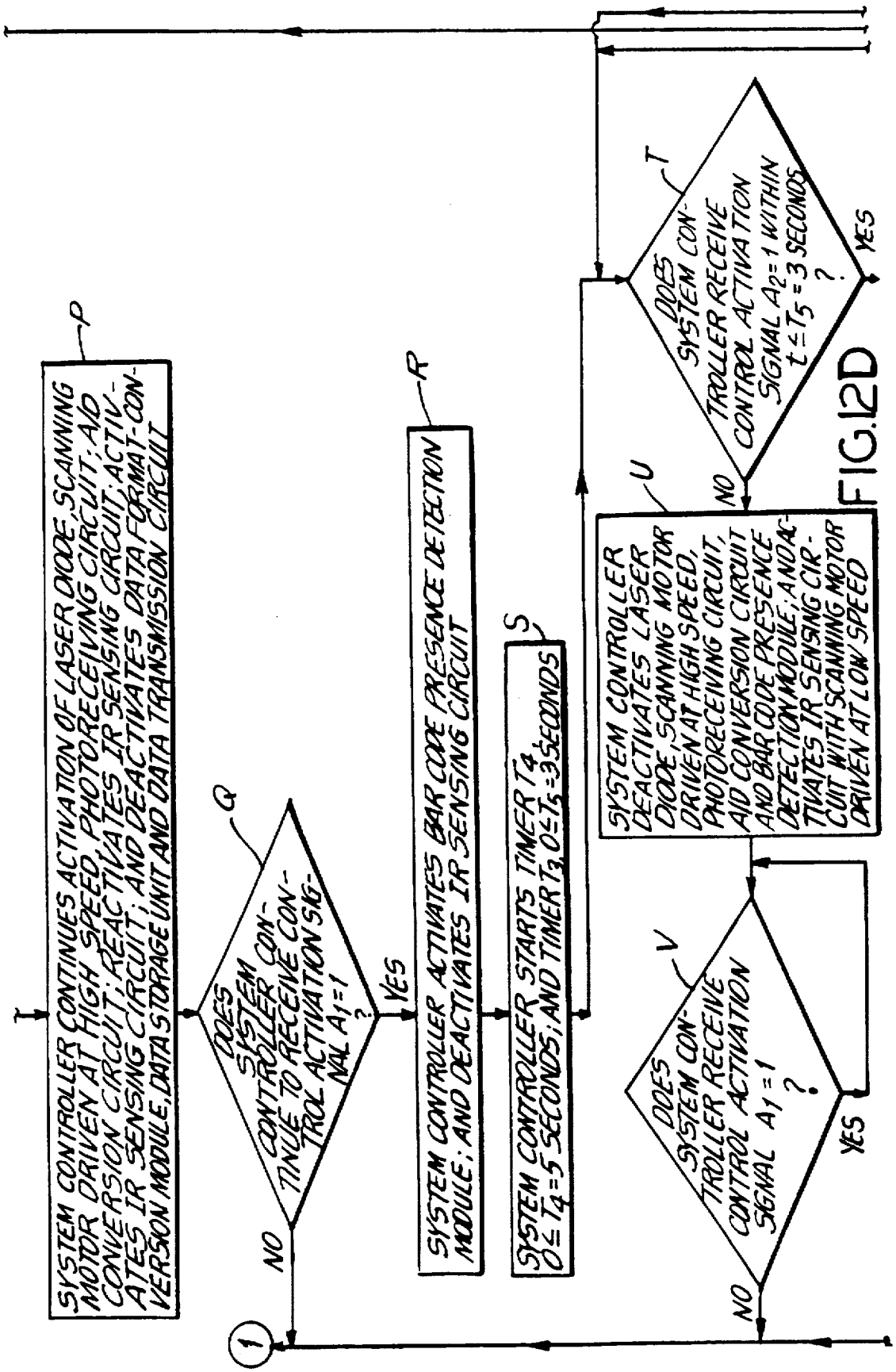
Figure 12E:
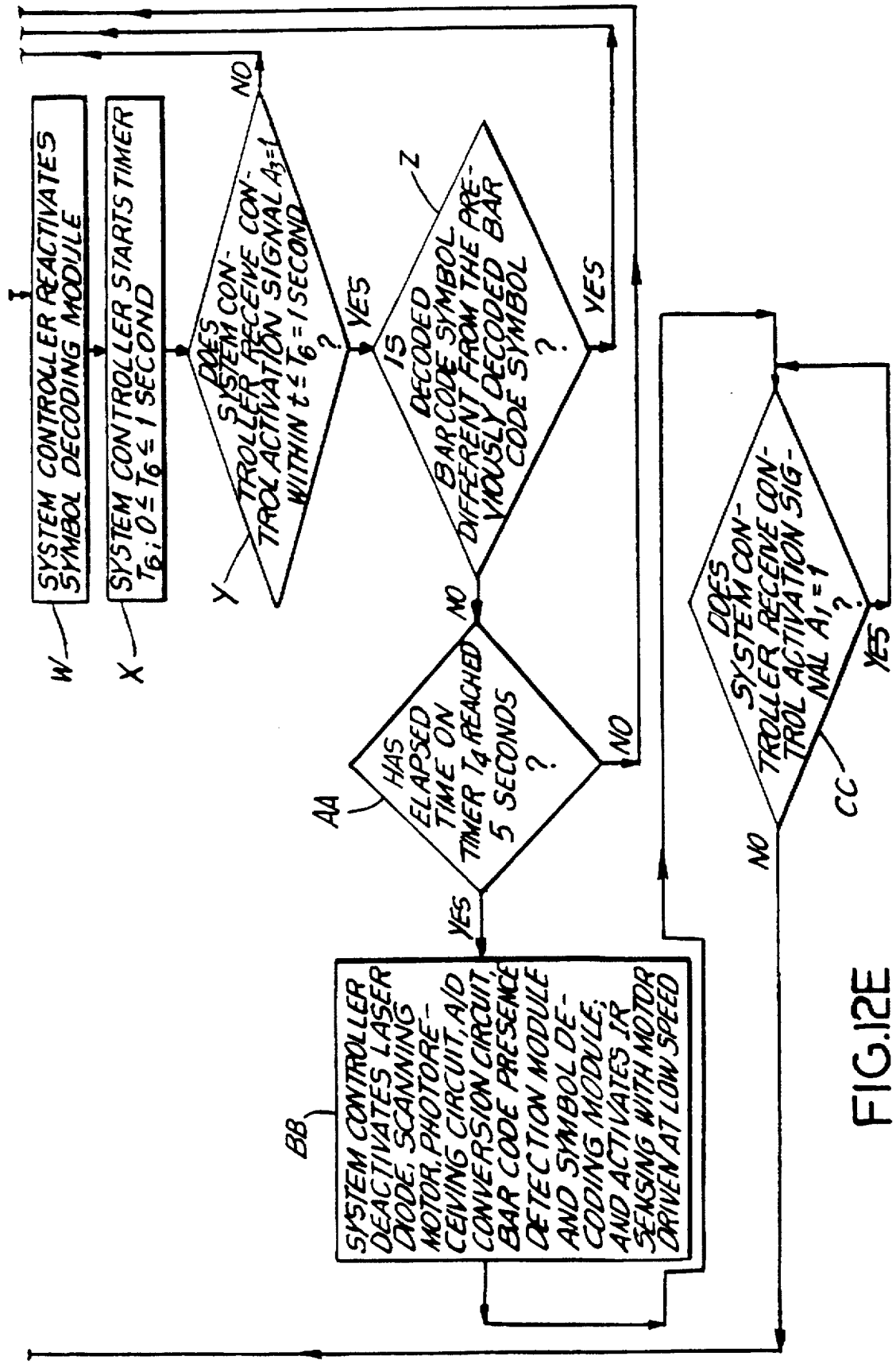

In FIGS. 10C and 10D, an alternative optical signal processing arrangement for automatic bar code symbol reader 2' is shown. Notably, similar structure or elements shown in FIGS. 10A through 10D are indicated both by like reference numbers. According to this alternative embodiment, during time intervals determined by the system controller (as indicated in FIGS. 12A and 12B). At time intervals determined by the system controller, IR return energy and laser return light from the object detection and scan fields, respectively, will each be (i) passed through frequency selective transmission window 110; collected through common optical elements 71 and 76; (iii) passed through frequency selective optical filter system 111; (iv) focused by focusing lens 112; (v) detected by photoreceiver 54; and subsequently converted and amplified by current-to-voltage amplifier 113 and preamplifier 114. Using a laser beam having a wavelength of about 940 nanometers and IR object sensing energy of about 640 nanometers, the frequency transmission characteristics of transmission window 110 and optical filter system 112 will be selected so as to effectively produce two narrow pass-bands for transmission of IR return energy and laser return light to photoreceiver 54. The first narrowpass band will be centered about 640 nanometers for IR return energy, whereas the second narrow pass-band will be centered about 940 nanometers for laser return light. In an illustrative embodiment, optical filter system 111 can be realized by one or more dielectric or other type filters, the nature of which is well known in the art.

The detected IR signal produced from amplifier 114 during object detection, is provided to synchronous transmitter/receiver 27, which has been described above. Its function is to compare the detected IR return signal with the pulsed IR signal, produced from IR LED 28 and transmitted through lens 29 as hereinbefore described. As previously described, the output of synchronous transmitter receiver 27 is control activation signal $A_1$ which is provided to the system controller.

The detected analogue scan data signal $D_1$, produced from preamplifer 114 during bar code presence detection and bar code reading, is provided to A/D conversion unit 13 for signal conversion as hereinbefore described.

In order that common signal processor 115 is operative during the object detection, bar code presence detection and bar code reading states, the system controller continuously provides enable signal $E_{CPE}=1$ to common signal processor 115, as shown. However, during the bar code presence detection and bar code reading states, the system controller provides IR disable signal $E_{IRD}=1$ to IR transmitting and receiving circuit 116, in order to disable the operation thereof. Aside from the above described modifications to automatic bar code symbol reading device 2', the system controller of this illustrative embodiment will operate in general accordance with the system control program of FIGS. 12A and 12B.

Having described the detailed structure and internal functions of the automatic bar code symbol reading device of the second illustrative embodiment of the present invention, the operation of the system controller thereof will now be described with reference to blocks A through CC in FIGS. 12A and 12B and the system block diagram shown in FIG. 11.

Beginning at the START block of Main System Control Routine No. 2 and proceeding to block A, bar code symbol reading device 2' is initialized. This involves continuously activating (i.e., enabling) the system controller. The system controller, on the other hand, activates IR sensing circuit 10A with scanning motor 72 driven at low speed. In addition, the system controller deactivates the remainder of activatable system components, e.g. laser diode 47, photoreceiving circuit 12', A/D conversion circuit 13, bar code presence detection module 14, bar code scan data range detection module 15, symbol decoding module 16, data format conversion module 17, data storage unit 18, and data transmission circuit 19. All timers $T_1$, $T_2$, $T_3$, $T_4$ and $T_5$ (not shown) maintained by the system controller are reset to t=0.

Proceeding to block B, the system controller checks to determine whether control activation signal $A_1=1$ is received from IR sensing circuit 10A. If this signal is not received, then the system controller returns to the START block. If signal $A_1=1$ is received, indicative that an object has been detected within the object detection field, then the system controller proceeds to block C, at which timer $T_1$ is started and is permitted to run for a preset time period, e.g. $0 \leq T_1 \leq 3$ seconds, and timer $T_2$ is started and permitted to run for a preset time period $0 \leq T_2 \leq 5$ seconds.

Proceeding to Block D, the system controller activates laser diode 47, scanning motor 72 driven at high speed, photoreceiving circuit 12', A/D conversion circuit 13 and bar code presence detection module 14 in order to collect and analyze scan data for the purpose of determining whether or not a bar code resides within the scan field. Then, at block E, the system controller checks to determine whether control activation signal $A_2=1$ is received from bar code presence detection module 14 within time period $1 \leq T_1 \leq 3$ seconds. If activation control signal $A_2$, is not received within this time period, indicative that a bar code is not within the scan field, then the system controller proceeds to block F. At block F, the system controller deactivates laser diode 47, scanning motor 72 driven at high speed, photoreceiving circuit 12', A/D conversion circuit 13 and bar code presence detection module 14. In addition, the system controller reactivates IR sensing circuit 10A and scanning motor 72 driven at slow speed. Then the system controller remains at block G until it receives control activation signal $A_1=0$ from the IR sensing circuit, indicative that the object is no longer in the object detection field. The system controller returns to the START block.

It, however, the system controller receives control activation signal $A_2=1$ within time period $0 \leq T_1 \leq 3$ seconds, indicative that a bar code has been detected, then the system controller proceeds to block H. As will be described hereinafter, this represents a state transition from bar code presence detection to bar code reading. Proceeding to block H, the system controller continues activation of laser diode 47, scanning motor 72, photoreceiving circuit 12' and A/D conversion circuit 13, and commences activation of symbol decoding module 16. At this stage, fresh bar code scan data is collected and is subject to decode processing. At essentially the same time, at block I, the system controller starts timer $T_3$ to run for a time period $0 \leq T_3 \leq 1$ second.

As indicated at block J, the system controller checks to determine whether control activation signal $A_3=1$ is received from the symbol decoding module 16 within $T_3=1$ second, indicative that a bar code symbol has been successfully read (i.e., scanned and decoded) within the allotted time period. If control activation signal $A_3$ is not received within the time period $T_3=1$ second, then at block K the system controller checks to determine whether control activation signal $A_2=1$ is received within the time period $0 \leq T_3 \leq 3$ seconds. If a bar code symbol is not detected within this time period, then the system controller proceeds to block L to deactivate laser diode 47, scanning motor 72 driven at high speed, photoreceiving circuit 12', A/D conversion circuit 13, bar code presence detection module 14 and symbol decoding module 16. In addition, the system controller reactivates IR sensing circuit 10A and scanning motor 72 driven at low speed. Notably, this event causes a state transition from bar code reading to object detection. Thereafter, at block M the system controller remains in the object detection state awaiting control activation signal $A_1=0$, indicative that an object is no longer in the object detection field. When this condition exists, the system controller returns to the START block, as shown.

If at block K, however, the system controller receives control activation signal $A_2=1$, indicative that a bar code once again is within the scan field, then the system controller checks to determine whether time period $T_2$ has elapsed. If it has, then the system controller proceeds to block L and then to the START block by way of block M. If, however, time period $0 \leq T_2 \leq 5$ seconds has not elapsed, then the system controller resets timer $T_3$ to run once again for a time period $0 \leq T_3 \leq 1$ second. In essence, this provides the device at least another opportunity to read a bar code present within the scan field when the system controller returns to control block J.

Upon receiving control activation signal $A_3=1$ from the symbol decoding module, indicative that a bar code symbol has been successfully read, the system controller proceeds to block O. At this stage of the system control process, the system controller continues to activate laser diode 47, scanning motor 72 driven at high speed, photoreceiving circuit 12' and A/D conversion circuit 13, while deactivating symbol decoding module 16 and commencing activation of data format conversion module 17, data storage unit 18 and data transmission circuit 19. These operations maintain the scanning of the laser beam across the scan field, while symbol character data is appropriately formatted and transmitted to data collection device 3 by a conventional data communication process, well known in the art.

After transmission of symbol character data to data collection device 3 is completed, the system controller enters block P and continues activation of laser diode 47, scanning motor 72 driven at high speed, photoreceiving circuit 12' and A/D conversion circuit 13, while reactivating IR sensing circuit 10A and deactivating symbol decoding module 16, data format-conversion module 17, data storage unit 18 and data transmission circuit 19. To detect the continued presence of an object within the object detection field, the system controller checks at block Q whether control activation signal $A_1=1$ is received from IR sensing circuit 10A. If $A_1=0$, indicative that the object is no longer in the object detection field, then the system controller returns to the START block. If control activation signal $A_1=1$ is received, then at block R the system controller activates bar code presence detection module 14, and deactivates IR sensing circuit 10A. These events represent once again a state transition from object detection to bar code symbol presence detection.

At block S, the system controller starts timer $T_4$ to run for a time period $0 \leq T_4 \leq 5$ seconds, and timer $T_5$ to run for a time period $0 \leq T_5 \leq 3$ seconds. Then to determine whether a bar code symbol has been detected within the scan field, system controller proceeds to block T to check whether control activation signal $A_2=1$ is received. If this signal is not received with the time period $0 \leq T_5 \leq 3$ seconds, indicative that no bar code symbol is present in the scan field, the system controller proceeds to block U, at which it deactivates laser diode 47, scanning motor 72 driven at high speed, photoreceiving circuit 12', A/D conversion circuit 13 and bar code presence detection module 14. In addition, the system controller reactivates IR sensing circuit 10A and scanning motor 72 driven at low speed. Thereafter, the system controller remains at block V until the object leaves the object detection field and (i.e., receives control activation signal $A_2=0$), at which time the system controller returns to the START block, as shown.

If, however, at block T control activation signal $A_2=1$ is received, indicative that a bar code symbol has been detected in the scan field, the system controller proceeds through blocks W and X to reactivate symbol decoding module 16 and start timer $T_6$ to run for a time period $0 \leq T_6 \leq 1$ second. These events represent a state transition from bar code symbol presence detection to bar code symbol reading. At block Y, the system controller checks to determine whether control activation signal $A_3=1$ is received from the signal decoding module within time period $0 \leq T_6 \leq 1$ second. If a bar code symbol is not successfully read within this 1 second time period, the system controller returns to block T to form a first loop, within which the device is permitted to detect or redetect a bar code symbol within the time period $0 \leq T_4 \leq 5$ seconds. If a bar code symbol is decoded within this time interval, the system controller determines at block Z whether the decoded bar code symbol is different from the previously decoded bar code symbol. If it is different, then the system controller returns to block O as illustrated, to format and transmit symbol character data as described hereinabove.

If, however, the decoded bar code symbol is not different than the previously decoded bar code symbol, then at block AA the system controller checks to determine whether timer $T_4$ has lapsed. If it has not lapsed, the system controller returns to block T to form a second loop, within which the device is permitted to detect or redetect a bar code symbol in the scan field and then successfully read a valid bar code symbol within the set time interval $0 \leq T_4 \leq 5$ seconds. If, however, timer $T_4$ lapses, then the system controller proceeds to block BB, at which the system controller deactivates laser diode 47, scanning motor 82 driven at high speed, photoreceiving circuit 12', A/D conversion circuit 13, bar code presence detection module 14 and symbol decoding module 16. In addition, system controller reactivates IR sensing circuit 10A and scanning motor 72 driven at low speed. Thereafter, the system controller remains at block CC until control activation signal $A_1=0$ is received from IR sensing circuit 10A, indicative that the object detection field is free of any objects. At this stage, the system controller returns to the START block, as shown in FIG. 12B.

Having described the operation of the first and second illustrative embodiments of the bar code symbol reading device hereof, it will be helpful at this juncture to describe the various conditions which will cause state transitions to occur during the automatic operation of the device. In this regard, reference is made to FIG. 13 which provides a state transition diagram for the illustrated embodiments.

Figure 13:
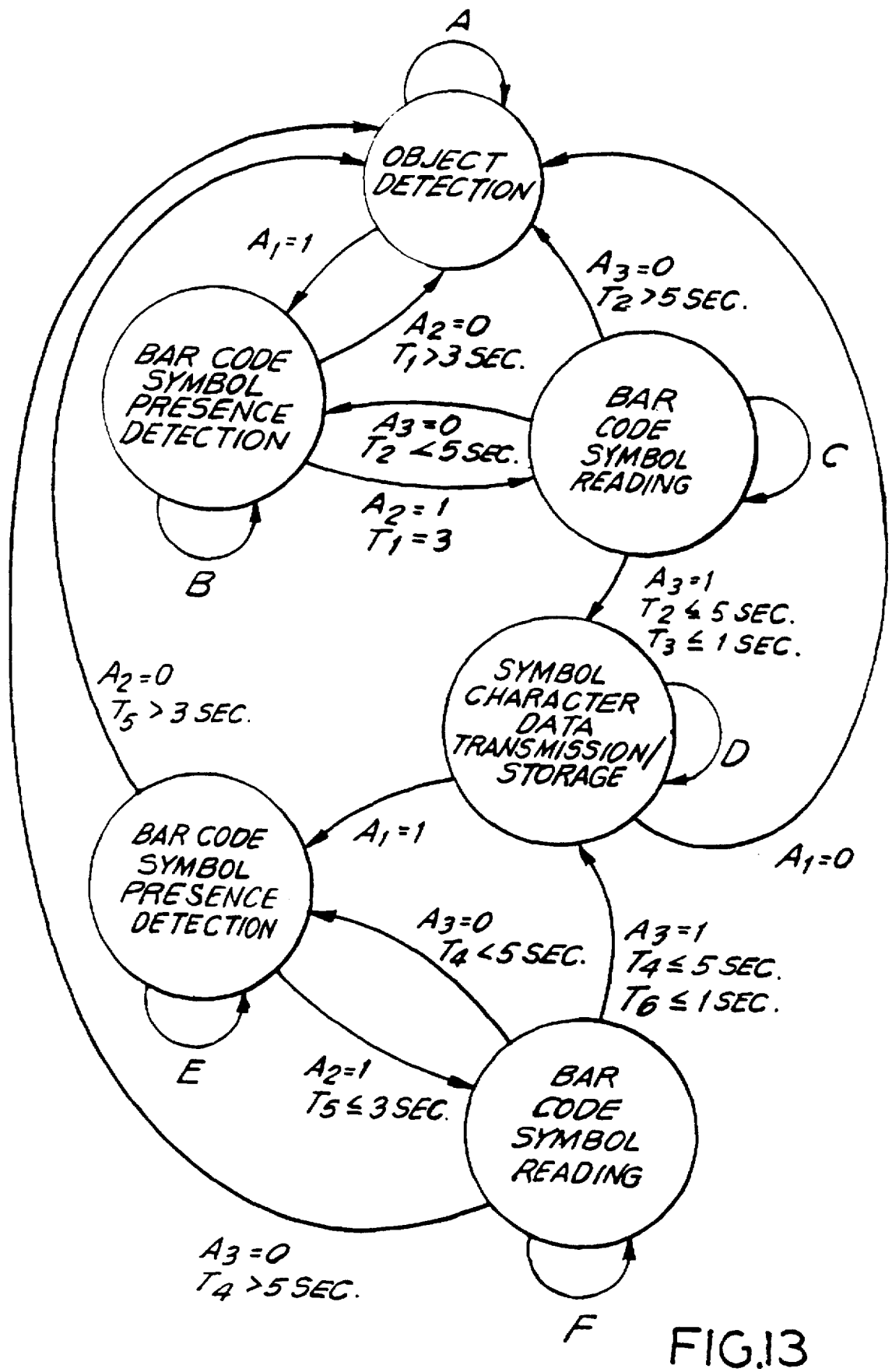
FIG. 13 is a state diagram illustrating the various states that the automatic bar code symbol reading devices of the illustrative embodiments may undergo during the course of their operation.

As illustrated in FIG. 13, the automatic bar code symbol reading device of the present invention has four basic states of operation namely: object detection, bar code symbol presence detection, bar code symbol reading, and symbol character data transmission/storage. The nature of each of these states have been described hereinabove in great detail. These four states are schematically illustrated as A,B, C and D, respectively, in the state transition diagram of FIG. 13. Notably, two "extensional states" have also been provided so that the automatic bar code reading devices of the illustrative embodiments are capable of reading an infinite number of consecutively different bar code symbols without returning to the object detection state. These states of operation are indicated as E and F and represent bar code presence detection and bar code symbol reading operations, respectively. As described above, these operations are employed when attempting to automatically read one or more consecutively different bar codes symbols, that is, after a first bar code symbol has been successfully read utilizing operation states A through C.

As shown in FIG. 13, transitions between the various states are indicated by directional arrows, besides each of which are transition conditions expressed in terms of control activation signals (e.g. $A_1$, $A_2$ and $A_3$), and where appropriate, state time intervals (e.g. $T_1$, $T_2$, $T_3$, $T_4$, $T_5$ and $T_6$). Conveniently, the state diagram of FIG. 13 expresses most simply the four basic and two extensional operations occurring during the control flow within the system control programs of FIGS. 8A and 8B, and FIGS. 12A and 12B. Significantly, the control activation signals At, $A_2$ and $A_3$ in FIG. 13 indicate which events within the object detection and/or scan fields can operate to effect a state transition within the allotted time frame(s), where prescribed.

Referring now to FIGS. 1, 14 through 16B, portable data collection device of the present invention will be described.

Figure 14A:
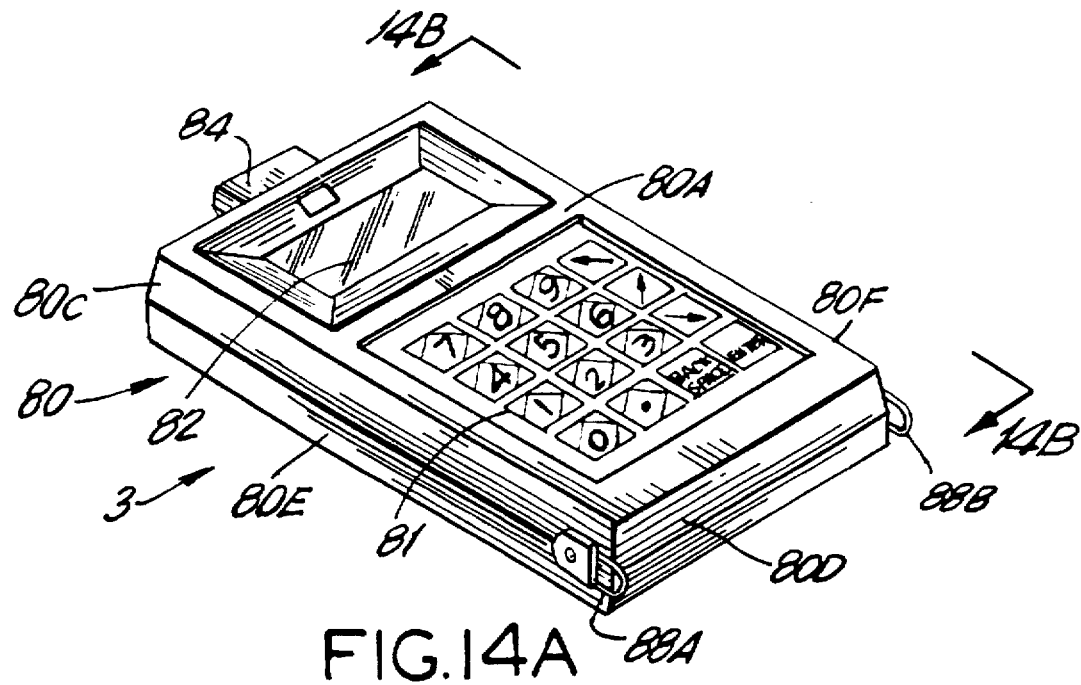
FIG. 14A is a perspective view of the portable hand-holdable data collection device of the present invention shown in FIG. 1.
Figure 14B:
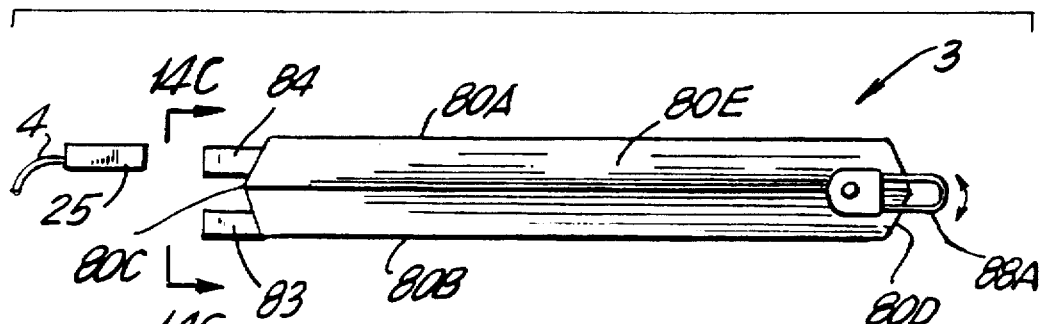
FIG. 14B is an elevated side view of the data collection and storage device of the present invention, taken along line 14B—14B of FIG. 14B.
Figure 14C:
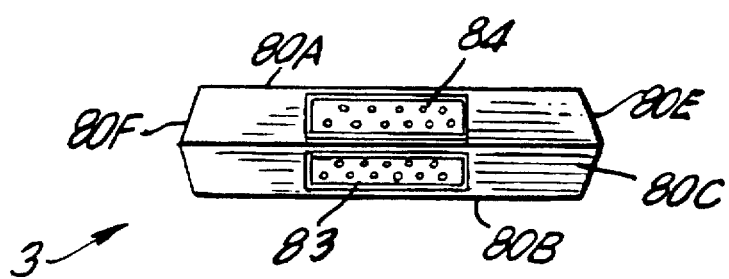
FIG. 14C is an elevated rear view of the data collection and storage device of the present invention, taken along line 14C—14C of FIG. 14B.

As illustrated in FIGS. 14 through 14B, data collection device 3 of the illustrative embodiment comprises a hand-holdable housing 80 which houses the operative elements of the device to be described below. Housing 80 has a top panel 80A, bottom panel 80B, front and rear panels 80C and 80D, and two opposing side panels 80E and 80F, as shown. A 4×4 membrane keypad 81 is mounted through the lower portions of top panel 80A for manual entry of alphanumeric type data including, for example, data related to bar code symbols. Notably, a separate switch is provided for turning the device ON and OFF. Above the keypad, there is mounted an LCD type 1×16 character display 82 for visually displaying data including (i) data being manually entered through keypad 81, (ii) operator messages and (ii) data entry verification messages which will be described in greater detail hereinafter.

Through front panel 80C adjacent character display 82, data-input and data-output communications ports 83 and 84, respectively, are provided. As will be described in greater detail hereinafter, data-input communication port 83 is particularly adapted (i) for receiving symbol character data from the data-output communication port of a hand-holdable bar code symbol reading device (e.g. 2 or 2'), and (ii) for simultaneously providing electrical power to the power receiving lines (e.g. 23) thereof, which are physically associated with its data-output port (e.g. multi-pin connector plug 25 shown in FIG. 4). In contrast, data-output communication port 84 is particularly adapted for transmitting collected symbol character data stored in device 3, through the data-input communication port of a data-receiving host device, such as a point of sale (POS) cash register/computer 85, illustrated in FIGS. 7A through 7C.

As shown in FIG. 14B, in particular, data-input communication port 83 is realized in the illustrative embodiment by a 9 pin female connector, whereas data-output communication port 84 is realized as a 9 pin male connector. In this way, the 9 pin male connector 25 used to realize the data-output communication port of bar code symbol reading devices 2 and 2', can be simply plugged into data-input communication port 83 to establish a physical interface. Preferably hand-threaded screw fasteners (not shown) are provided on the 9 pin male connector 25 to effect a secure interconnection with data-input port 83 during portable bar code symbol reading applications.

For conveniently supporting the data collection device on the operator's body while, for example, taking inventory, a pair of D-rings 88A and 88B are rotatably mounted to the rear end of the housing. In this way, a cord, shoulder strap or belt strap can be attached to the D-rings. With this housing support arrangement, the user can simply pickup the hand-holdable data collection device in one hand and manually enter data through the keypad using one's thumb while viewing the character display screen.

The hand-holdable data collection device includes a battery-power storage unit 89 realized, in the illustrative embodiment as four AA type 1.5 volt batteries. While not shown, these batteries are contained within a battery carrier attached to a hinged panel formed in on the bottom panel 80B of the housing. Access to the battery carrier is achieved simply by opening the hinged panel, which after replacement of batteries, can be snapped shut.

Referring to FIG. 15, the various components comprising the hand-holdable data collection device are shown integrated about its system controller 90. In the illustrated embodiment, the system controller is implemented by a microprocessor associated with program memory (e.g. EEPROM) for storing a system control program. Buffer memory (e.g. RAM) and appropriate latching circuitry are typically provided as well in manner known in the art.

As shown in FIG. 15, the system controller is operably connected with data entry keypad 81 and character display 82 for entering and displaying data, respectively, as hereinbefore described. Data-input and data-output communication ports 83 and 84 are each operably connected to a communication driver circuit 91 by data transmitting and receiving lines $T_{x1}$ and $R_{x1}$, respectively, as shown. In turn, the system controller is operably connected to communication driver circuit 91 by data transmitting and receiving lines, $T_{x2}$ and $R_{x2}$, respectively. With this arrangement, data communication protocol and the like can be transacted between (i) a bar code symbol reading device connected to data-input communication port 83 and (ii) communication driver circuit 91 via data transmitting and receiving lines $T_{x1}$ and $R_{x1}$. Also, this arrangement facilitates transaction of data communication protocol and the like between (i) a host device (e.g. cash register/computer 85) connected to data-output communication port 84, and (ii) communication driver circuit 91.

While not shown in FIG. 15 to avoid obfuscation, a conventional and power distribution circuit will be provided for distributing power from the positive side of six volt supply 89, to all power consuming elements within the data collection device. In order to generate a twelve (12) volt supply for use within automatic bar code symbol reading devices 2 and 2', a power conversion circuit 92 is provided. As illustrated, battery power unit 89 provides a six (6) volt supply to power conversion circuit 92, generating a twelve (12) volt supply. The six and twelve volt supply lines are, in turn, provided to a power switching circuit 93, which is controlled by the system controller by power switch enable signal $E_R$. The six and twelve volt power lines from power switching unit 93 are connected to a pair of designated pins within the 9 pin data-input communication port 83, as shown. To detect low battery power levels, battery detect circuit 94 is operably connected between the positive side of battery supply 89 and the system controller.

To determine whether the data-output communication port of a bar code symbol reader is physically (and electrically) connected to data-input communication port 83 of the data collection device, a bar code reader detect circuit 95 is operably connected between data-input communication port 83 and the system controller, as shown. Notably, when bar code reader detect circuit 95 detects a bar code reader plugged into data-input communications port 83, it will provide a bar code reader detect signal $A_{UL}$ to the system controller. This signal automatically activates the system controller to begin initializing for "uploading" of bar code symbol character data from the bar code reader. Also, bar code reader detect signal $A_{UL}$ causes the system controller to provide power switch enable signal $E_R$ to power switching circuit 93, to thereby empower the connected bar code reading device with the six and twelve volt power supply lines.

Similarly, to determine whether the data-input communication port of a host device is physically (and electrically) connected to data-output communication port 84 of the data collection device, a host device detect circuit 96 is operably connected between data-output communication port 84 and the system controller, as shown. Thus, when host device detect circuit 96 detects a host device plugged into data-output communication port 84, it will provide a host device detect signal $A_{DL}$ to the system controller which automatically activates the system controller to begin initializing for "downloading" of collected bar code symbol character data, from the data collection device into the host device. To permit the host device to supply power to the data collection device during data downloading operations, and thus conserve battery power, a power supply line 97 is provided between a pin of data-output communication port 84 and the positive side of battery supply 89. To restrict power flow from the host device to the data collection device, a diode 98 is inserted within this power supply line 97, as shown.

Symbol character data downloaded from a bar code reading device and collected through data-input communication port 83, is stored within a data storage unit 99, realized in the illustrative embodiment as 32 kilobytes of RAM. To facilitate transfer of such data from the system controller to RAM storage unit 99, a data bus 100 is provided, as shown. Also associated with data bus 100 is a non-volatile data storage unit 101. The system controller will typically store particular data items, such as set-up parameters and the like, in non-volatile RAM storage unit 101 as such data can be retained therein for the lifetime of the data collection device.

RAM storage unit 99 is protected by a power-fail/protect-RAM circuit 102 that is operably associated with a storage capacitor 103, the write line of RAM storage unit 99 and the system controller. By this circuit 102, RAM storage unit 99 is protected in two ways. Firstly, during power transitions, circuit 99 inhibits write signals to RAM storage unit 99, and consequently stored symbol character data is protected from corruption. Secondly, during periods of battery power failure, circuit 102 enables storage capacitor 103 to provide power to RAM storage unit 99 for minimally one hour in order to maintain the integrity of stored symbol character data.

Having described the structure and function of the data collection device of the illustrative embodiment, its versatile operation will now be described with reference to the system control program illustrated in FIGS. 16A and 16B.

Figure 16A:
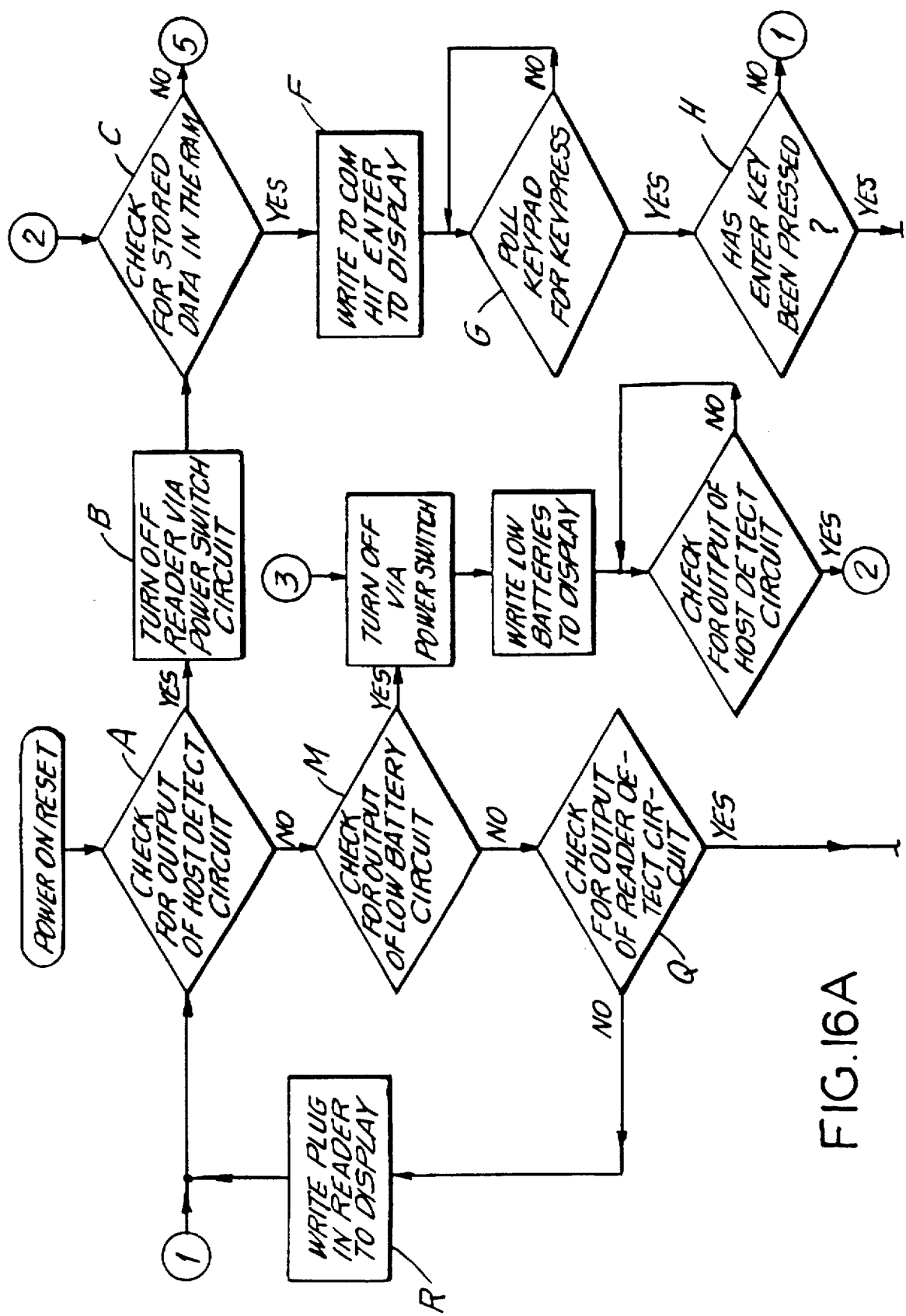
FIGS. 16A to 16B, taken together, show a flow chart of a system control program for the data collection device of the present invention illustrating various operational states that the data collection and storage device may undergo during its programmed operation, and indicating various operator prompts displayed on its visual display during various modes of use.
Figure 16C:
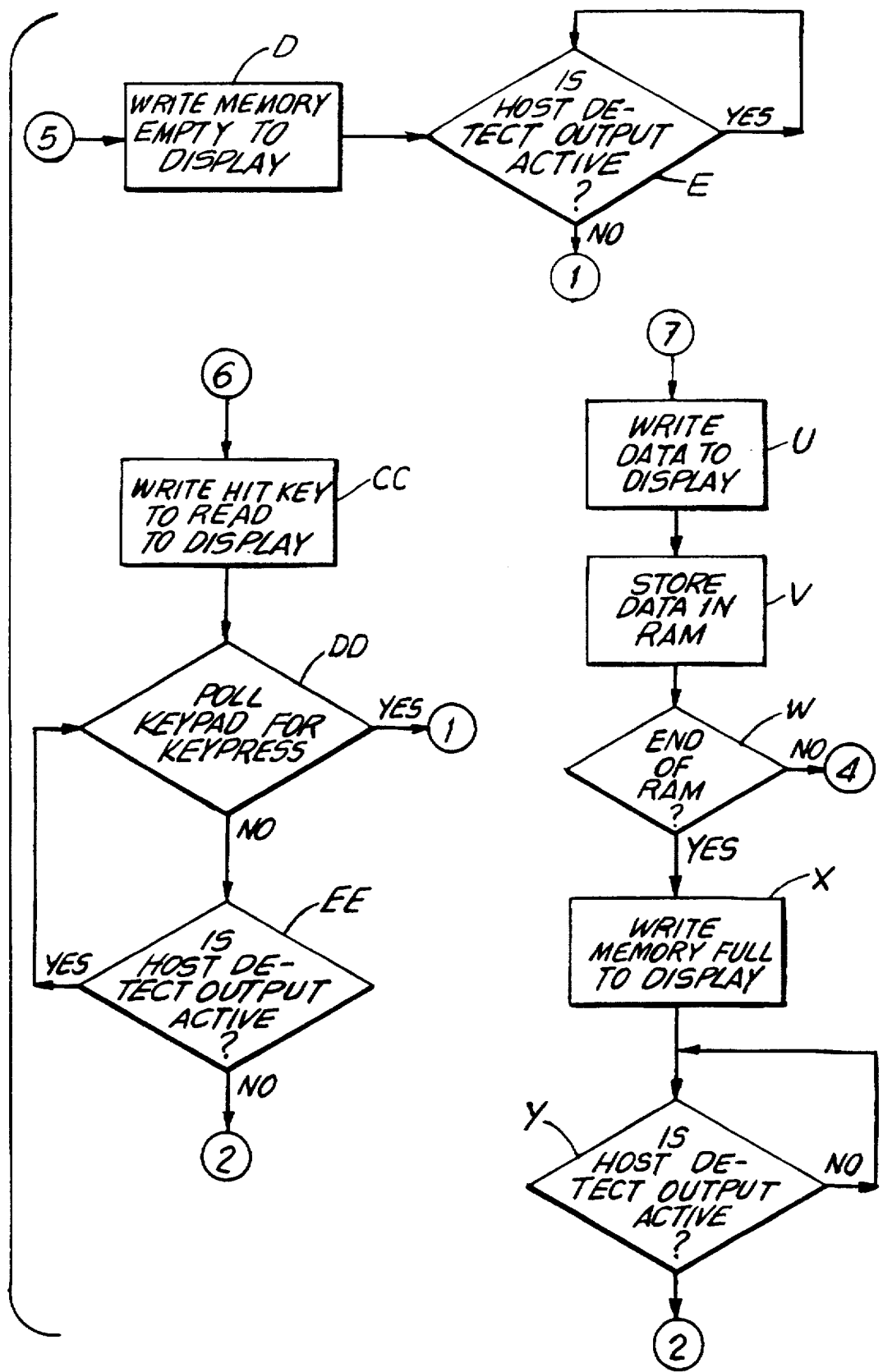

As indicated in FIG. 16A, upon enabling the POWER-ON switch, the system controller advances to block A. At block A, the system controller checks to determine whether the output of host detect circuit 96 indicates that a host device is plugged into data-output communication port 84. If it does detect this condition, then the system controller disconnects power supply 89 from data-input communication port 83 (and thus any bar code symbol reader connected thereto) by way of power switching circuit 93. Then at block C, the system controller checks to determine whether there is any data stored in RAM storage unit 99 for downloading to the connected host device. If there is no data stored in RAM storage unit 99, then the system controller proceeds to block D, and writes "MEMORY EMPTY" to character display 82. Thereafter, the system controller remains at block E until it receives host detect signal $A_{DL}=0$ indicative that the host device is no longer plugged into data-output communications port 84. Upon the occurrence of this event, the system controller returns to block A, as shown.

If, at block C, the system controller determines that there is data stored in RAM storage unit 99 for downloading into the host device, then at block F the system controller writes "TO COM-HIT ENTER" to character display 82. At block G, the system controller polls the keypad for the occurrence of a key press operation, and at block H determines whether the ENTER key has been pressed. If any key other than the ENTER is pressed, then the system controller returns to control block A. If the ENTER key is pressed, the system controller writes "TRANSMITTING" to character display 82, and then at block J downloads data from RAM storage unit 99 to the host device connected to data-output communication port 84. At block Y, the system checks to determine if all data in RAM storage unit 99 has been transmitted, and if so, writes "MEMORY EMPTY" or "DOWNLOAD COMPLETE" to character display 82, as indicated at block D. Thereafter, the system controller remains at block E until the host device is disconnected from data-output communication port 84, and thereupon returns to block A.

If it is determined at block K that data transfer from RAM storage unit 99 is not complete, then as indicated at block L, the system controller checks to determine whether the host device is still connected to data-output communication port 84 (i.e., $A_{DL}=1$). If host device has been disconnected (i.e., $A_{DL}=0$), then the system controller returns to block A, as shown. If, on the other hand, the host device remains connected to data-output communications port 84, the system controller returns to block J to form a control loop within which the system controller will remain so long as there remains data in RAM storage unit 99 and the host device remains connected to data-output communication port 84.

As indicated at block A, if the system controller does not receive host detect signal $A_{DL}=1$ from host detect circuit 96, indicative that a host device is plugged into the data-output communication port, then the system controller proceeds to block M. At block M, the system controller first checks the output of low battery circuit 94 to determine that sufficient power is available to energize a bar code symbol reading device if plugged into data-input communication port 83. If insufficient battery strength is indicated, then at block N the system controller disconnects battery power supply 89 from data-input communication port 93 by way of power switching circuit 94. Thereafter at block O, the system controller writes "LOW BATTERIES" to character display 82. The system controller remains at block P until it receives host detect signal $A_{DL}=1$, indicative that the host device is plugged into data-output communication port 84. If so, the system controller advances to block C, as hereinbefore described. Notably, this choice of control flow is based on the fact that, during data downloading operations, power is supplied to the data collection device by the host device, and the battery level of the data collection device is of no consequence during such operations.

If, however, at block M low battery level is not detected, then the system controller proceeds to block Q. At block Q, the system controller checks the output of bar code reader detect circuit 95 to determine whether a bar code reader is plugged into data-input communication port 83. If the system control receives bar code reader detect signal $A_{UL}=0$, then at block R system controller writes "PLUG-IN READER" to character display 82. Thereafter, the system controller returns to block A, as shown. If the system controller receives $A_{UL}=1$, indicative that a bar code reader is plugged into data-input communication port 83, then the system controller writes "READY TO READ" to character display 82, as indicated at block S.

At block T, the system controller polls both communication driver (i.e., receiver) circuit 91 and keypad 81 for entry of data. If either of these system components indicate receipt of data to be stored (e.g. from a bar code reader or the keypad), then as indicated at blocks U through V, the system controller uploads such data by first writing the data to character display 82, and then storing the data in RAM storage unit 99. Then, at block W, the system controller determines whether RAM storage unit 99 is filled to capacity. If it is, then at block X the system controller writes "MEMORY FULL" to character display 82 and thereafter remains at block Y until it receives host detect signal $A_{DL}=1$, indicative that a host device is connected to data-output communications port 84 for downloading collected data thereto. If a host device is detected at the data-output communications port 84, the system controller proceeds to block C for participating in downloading of a collection data, in a manner described above.

If, as indicated at block W, the system controller determines that RAM storage unit 99 is not full, then the system controller returns to block T, at which it checks again for incoming data over either the receiving lines $R_{x2}$ of communication driver circuit 91 (i.e., bar code reader input) or from the keypad. If there is incoming data from either of these system components, then the system controller proceeds to blocks U and V for participating in data uploading, as described above. The system controller will follow this control loop provided that data is presented for collection and RAM storage unit 99 has vacant memory storage space.

If at block T, the system controller determines that no data is being presented for collection, then at block Z it checks the battery power supply level of the battery supply unit 89. If a low battery level is detected, then the system controller proceeds to blocks N, O and P described above. At these control blocks, power supply to data-input communication port 93 is disconnected in order to terminate power to the connected bar code reading device, and the "LOW BATTERIES" message is written to character display 82. If, however, a low battery level is not detected, then the system controller determines at block AA whether any incoming data has been presented for collection (i.e., by data uploading) within a predetermined time period (e.g. 2 minutes). If no data has been presented for uploading, then as indicated at block BB, the system controller "turns off" the connected bar code reader by disconnecting the supply of battery power to data-input communication port 83 by way of power switching circuit 93. Thereafter, as indicated at block CC, the system controller writes "HIT KEY TO READ" message to character display 82. Then at block DD, the system controller polls the keypad for a key press operation. If any key is pressed, the system controller remains in a control loop between blocks DD and EE and determines whether a key has been pressed, or a host device has been connected to data-output communication port 84. If the system controller receives host detect signal $A_{DL}=1$ indicative that a host device is plugged into data-output communication port 84, the system controller then proceeds to block C, automatically enabling the data collection device for participation in the downloading of collected data, in a manner described above.

In the event that the operator desires to clear RAM storage unit 99 of collected data, the operator must enter a preset code word or alphanumeric code by way of keypad 81. This feature prevents accidental erasure of collected data.

Notably, the data collection device of the present invention does not require programming for data transfers. Instead, data uploading routines are programmed into data transmission circuit 19 of automatic bar code reading devices 2 and 2'. On the other hand, data downloading routines are programmed into the host data receiver. Preferably, these downloading routines are designed to accept downloaded symbols and create an ASC11 file.

The data collection device described above and the automatic bar code reading devices of the present invention provides an ultra-lightweight fully, portable bar code symbol reading system characterized by simplicity of operation, high-speed symbol recognition and versatility. The automatic bar code symbol reading device of the present invention has been provided with a wide variety of complex decision-making operations which accord the automatic bar code symbol reading system of the present invention with a level of intelligence hitherto unattained in the bar code symbol reading art. Within the spirit of the present invention, additional decision-making operations may be provided to further enhance the capabilities of the system.

While the particular illustrative embodiments shown and described above will be useful in many applications in code symbol reading, further modifications to the present invention herein disclosed will occur to persons skilled in the art. All such modifications are deemed to be within the scope and spirit of the present invention defined by the appended claims.

We claim:

1. A system for reading code symbols in either a long-range or short-range mode of preprogrammed operation, said system comprising:

a housing of compact construction having a light transmission aperture through which visible light can exit and enter said housing;

scan data producing means, disposed in said housing, for producing scan data from an object in a scan field defined external to said housing, said scan data producing means including means for producing a light beam within said housing, scanning said light beam across said scan field and a code symbol on an object located in at least a portion of said scan field, detecting the intensity of light reflected off said code symbol as said light beam is scanned across said scan field and said code symbol on said object, and producing scan data indicative of said detected intensity;

scan data processing means for processing produced scan data in order to determine whether said scanned code symbol is located in a predetermined short-range portion of said scan field or in a predetermined long-range portion of said scan field, and to decode said scanned code symbol, and data transmission means for transmitting said symbol character data to an external device;

wherein, when said system is in said short-range mode of preprogrammed operation, said symbol character data is transmitted from said data transmission means to said external device only when said decoded code symbol is located in said predetermined short-range portion of said scan field; and wherein, when said system is induced in said long-range mode of preprogrammed operation, said symbol character data is transmitted from said data transmission means to said external device only when said decoded code symbol is located in said predetermined long-range portion of said scan field; and control means for automatically controlling the operation of said system during said short-range and said long-range modes of preprogrammed operation.

2. The system of claim 1, wherein said light beam producing means comprises a laser diode for producing a visible laser beam.

3. The system of claim 1, wherein said code symbol is a bar code symbol having first and second envelope borders, and wherein said scan data processing means detects said scanned bar code symbol by processing scan data so as to detect the first and second envelope borders of said bar code symbol.

4. The system of claim 1, which further comprises object detection means disposed in said housing for automatically detecting the presence of said object in at least a portion of said scan field.

5. The system of claim 1, wherein said housing comprises a head portion and a handle portion, and wherein said light beam producing means, said light beam scanning means, and said light detecting means are disposed in said head portion.

6. The system of claim 1, which further comprises support stand detection means, disposed in said housing, for detecting the placement of said housing within a housing support stand.

7. The system of claim 1, wherein said support stand detection means comprises means for detecting a magnetic field produced in the vicinity of said housing support stand.

8. The system of claim 1, which further comprises manually actuable means for inducing said system into either said short-range mode of preprogrammed operation or said long-range mode of preprogrammed operation.

9. The system of claim 1, wherein said scan data processing means comprises:

means for processing produced scan data to produce digital count data; and means for analyzing said digital count data in order to determine whether said scanned bar code symbol is located in said predetermined short-range portion of said scan field or in said predetermined long-range portion of said scan field.

10. The system of claim 1, wherein said scan data processing means and said control means are disposed within said housing.

11. The system of claim 1, wherein said predetermined short-range portion of said scan field extends from about 0 inches out to no more than about 3 inches from said light transmission aperture, and wherein said predetermined long-range portion of said scan field extends from about 0 inches out to about at least 6 inches from said light transmission aperture.

12. The system of claim 1, wherein said external device is either a portable data collection device a host computer system.

13. The system of claim 1, wherein said scan data processing means further comprises means for determining whether a predetermined mode-selecting bar code symbol has been decoded, said predetermined mode-selecting bar code symbol being indicative of a selection to induce said system into either said short-range mode of preprogrammed operation or said long-range mode of preprogrammed operation.

14. A system for reading code symbols in either a first or second mode of preprogrammed operation, said system comprising:

a housing of compact construction having a light transmission aperture through which visible light can exit and enter said housing;

scan data producing means disposed to said housing, for producing scan data from an object in at least a portion of a scan field defined external to said housing, said scan data producing means including means for producing a light beam within said housing, projecting said light beam through said light transmission aperture and across said scan field and a code symbol on an object, detecting the intensity of light reflected off said code symbol as said light beam is projected across said scan field and said code symbol on said object, and producing scan data indicative of said detected intensity;

scan data processing means for processing produced scan data in order to determine whether said scanned code symbol is located in a first spatially-defined portion of said scan field or in a second spatially-defined portion of said scan field, and to decode said scanned code symbol, data transmission means for transmitting said symbol character data to an external device;

mode selection means for inducing said system into either said first mode of preprogrammed operation or said second mode of preprogrammed operation;

wherein, when said system is induced in said first mode of preprogrammed operation, said symbol character data is transmitted from said data transmission means only when said decoded code symbol is located in said first spatially-defined portion of said scan field; and wherein, when said system is induced in said second mode of preprogrammed operation, said symbol character data is transmitted from said data transmission means only when said decoded code symbol is located in said second spatially-defined portion of said scan field; and control means for automatically controlling the operation of said code symbol reading system during said first and second modes of preprogrammed operation.

15. The system of claim 14, wherein said light beam producing means comprises a laser diode for producing a visible laser beam.

16. The system of claim 14, wherein said code symbol is a bar code symbol having first and second envelope borders, and wherein said scan data processing means detects said scanned bar code symbol by processing scan data so as to detect the first and second envelope borders of said bar code symbol.

17. The system of claim 14, which further comprises object detection means disposed in said housing for detecting the presence of said object in at least a portion of said scan field.

18. The system of claim 14, wherein said housing comprises a head portion and a handle portion, and wherein said light beam producing means, said light beam scanning means, and said light detecting means are disposed in said head portion.

19. The system of claim 14, which further comprises support stand detection means, disposed in said housing, for detecting the placement of said housing within or on a housing support stand.

20. The system of claim 14, wherein said support stand detection means comprises means for detecting a magnetic field produced in the vicinity of said housing support stand.

21. The system of claim 14, which further comprises manually actuable means operably associated with said housing for inducing said system into either said first mode of preprogrammed operation or said second mode of preprogrammed operation.

22. The system of claim 14, wherein said scan data processing means comprises:

means for processing produced scan data to produce digital count data; and means for analyzing said digital count data in order to determine whether said scanned bar code symbol is located in said first spatially-defined portion of said scan field or in said second spatially-defined portion of said scan field.

23. The system of claim 14, wherein said scan data processing means and said control means are disposed within said housing.

24. The system of claim 14, wherein said first spatially-defined portion of said scan field extends from about 0 inches out to about 3 inches from said light transmission aperture, and wherein said second spatially-defined portion of said scan field extends from about 0 inches out to about at least 6 inches from said light transmission aperture.

25. The system of claim 14, wherein, when said system is induced in said first mode of preprogrammed operation, said symbol character data is transmitted from said data transmission means to an external device only when said decoded code symbol is located in said first spatially-defined portion of said scan field; and wherein, when said system is induced in said second mode of preprogrammed operation, said symbol character data is transmitted from said data transmission means to an external device only when said decoded code symbol is located in said second spatially-defined portion of said scan field.

26. The system of claim 14, wherein said external device is a portable data collection device and a host computer system.

* * * * *